US012703147B2

(12) United States Patent
Scialpi et al.

(10) Patent No.: US 12,703,147 B2
(45) Date of Patent: Aug. 11, 2026

(54) METHODS AND APPARATUS FOR TAILORED GRAIN SIZE IN AN ADDITIVE MANUFACTURING ENVIRONMENT

(71) Applicant: GE Avio S.R.L., Turin (IT)

(72) Inventors: Agostino Scialpi, San Giorgio Ionico (IT); Edoardo Maria Peradotto, Turin (IT); Giuseppe Greco, Veglie (IT)

(73) Assignee: GE Avio S.R.L., Rivalta di Torino (IT)

( * ) Notice: Subject to any disclaimer, the term of this patent is extended or adjusted under 35 U.S.C. 154(b) by 0 days.

(21) Appl. No.: 18/313,901

(22) Filed: May 8, 2023

(65) Prior Publication Data

US 2024/0149526 A1 May 9, 2024

(30) Foreign Application Priority Data

Nov. 3, 2022 (IT) ........................ 102022000022575

(51) Int. Cl.
*B29C 64/218* (2017.01)
*B29C 64/153* (2017.01)
(Continued)

(52) U.S. Cl.
CPC .......... *B29C 64/218* (2017.08); *B29C 64/153* (2017.08); *B29C 64/295* (2017.08); (Continued)

(58) Field of Classification Search
None
See application file for complete search history.

(56) References Cited

U.S. PATENT DOCUMENTS 4,601,874 A 7/1986 Marty et al.
8,087,567 B2 1/2012 Meschke et al.
(Continued)

FOREIGN PATENT DOCUMENTS

CN 106825574 B * 2/2020 ............. B33Y 10/00
CN 113305301 A 8/2021
(Continued)

OTHER PUBLICATIONS

Gao et al., "A Hybrid Directed Energy Deposition Process to Manipulate Microstructure and Properties of Austenitic Stainless Steel," Materials & Design, Elsevier, Amsterdam, vol. 213, Dec. 27, 2021, 15 pages.
(Continued)

*Primary Examiner* — Susan D Leong
*Assistant Examiner* — Xinwen Ye
(74) *Attorney, Agent, or Firm* — Hanley, Flight & Zimmerman, LLC

(57) ABSTRACT

Methods, apparatus, systems, and articles of manufacture are disclosed to generate a tailored grain size in an additive manufacturing environment. Disclosed herein is an apparatus comprising controller circuitry to determine a configuration for manufacture of a part, the part having a first portion and a second portion, an additive manufacturing machine to manufacture the part according to the configuration, and a force application device to apply a force to the part during manufacture, the force specified in the configuration to produce a desired grain size, the desired grain size including a first grain size and a second grain size, wherein the first portion is formed with the first grain size and the second portion is formed with the second grain size.

14 Claims, 12 Drawing Sheets

(51) Int. Cl.

| | |
|---|---|
| ***B29C 64/295*** | (2017.01) |
| ***B33Y 10/00*** | (2015.01) |
| ***B33Y 30/00*** | (2015.01) |
| ***B33Y 40/20*** | (2020.01) |

(52) U.S. Cl.

CPC ............... *B33Y 10/00* (2014.12); *B33Y 30/00* (2014.12); *B33Y 40/20* (2020.01)

(56) References Cited

U.S. PATENT DOCUMENTS

| | | | |
|---|---|---|---|
| 8,679,269 | B2 | 3/2014 | Goller et al. |
| 9,322,090 | B2 | 4/2016 | Goller et al. |
| 10,196,315 | B2 | 2/2019 | Kirby et al. |
| 11,033,959 | B2 | 6/2021 | Giovannetti et al. |
| 2008/0145691 | A1 | 6/2008 | Subramanian et al. |
| 2015/0266285 | A1 | 9/2015 | James et al. |
| 2018/0200798 | A1 | 7/2018 | Sharon et al. |
| 2022/0161490 | A1 * | 5/2022 | Jain ....................... B29C 64/218 |
| 2022/0193776 | A1 | 6/2022 | Lakshman et al. |

FOREIGN PATENT DOCUMENTS

| | | | | |
|---|---|---|---|---|
| CN | 113477927 | A * | 10/2021 | .............. B22F 7/062 |
| EP | 3266543 | A1 * | 1/2018 | ............... B21H 1/06 |
| EP | 3266543 | B1 | 8/2019 | |
| WO | 2012152259 | A1 | 11/2012 | |
| WO | 2019040795 | A1 | 2/2019 | |
| WO | 2020106372 | A2 | 5/2020 | |

OTHER PUBLICATIONS

Ministry of Enterprises and Made in Italy, "Office Action and Search Report," issued in connection with Italian Patent Application No. 102022000022575, dated May 31, 2023, 17 pages. [English Machine Translation].

China National Intellectual Property Administration, "The First Office Action and First Search," issued in connection with Chinese Patent Application No. 202311454719.8, dated May 28, 2026, 19 pages. [English translation included.].

* cited by examiner

METHODS AND APPARATUS FOR TAILORED GRAIN SIZE IN AN ADDITIVE MANUFACTURING ENVIRONMENT

RELATED APPLICATIONS

This patent arises from the national stage of Italian Application No. 102022000022575, which was filed on Nov. 3, 2022. Italian Application No. 102022000022575 is hereby incorporated herein by reference in its entirety. Priority to Italian Application No. 102022000022575 is hereby claimed.

FIELD OF THE DISCLOSURE

This disclosure relates generally to additive manufacturing and, more particularly, to methods and apparatus for a tailored grain size in an additive manufacturing environment.

BACKGROUND

Additive manufacturing (AM) uses computer-aided-design (CAD) software and/or three-dimensional (3D) object scanners to direct hardware to deposit material, layer upon layer, in precise geometric shapes. Each layer deposited bonds to the preceding layer of melted or partially melted material until a final 3D object is created. Some AM devices use lasers or electron beams to selectively melt or partially melt a bed of powdered material, and as the materials cool/cure, the materials fuse together to form the final 3D object.

Some AM devices alternatively use Directed Energy Deposition (DED) to deposit the material alongside the heat input simultaneously. DED allows for the creation of 3D objects by melting the material in powder or as a wire with a focused energy source as it is deposited by the nozzle of the AM device.

Figure 1A:
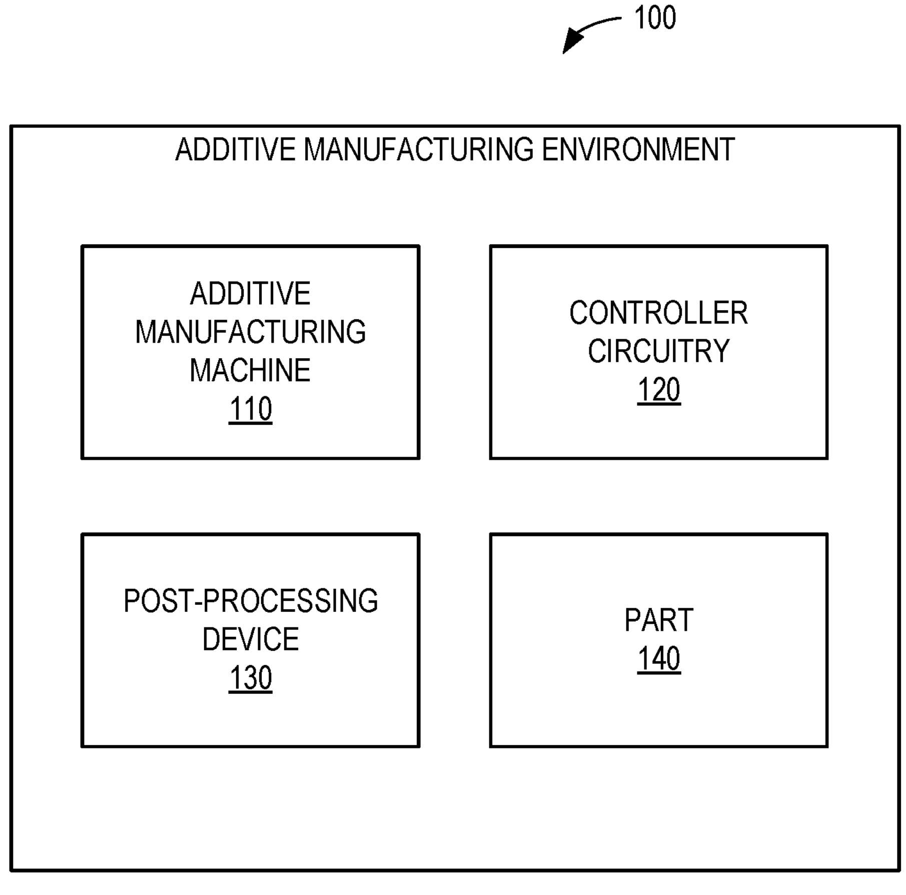
FIG. 1A is a block diagram of an example additive manufacturing infrastructure or environment.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Powder can be used to form parts in additive manufacturing (AM). Deposited material (e.g., metal, plastic, composite, etc.) have physical and/or material properties, such as grain size, which impact a resulting part formed from an AM process. Grain size is an important feature in AM components at least because the grain size affects the mechanical properties of the component which ultimately affects performance. Operating temperatures can suggest a preferred grain size for the component to increase performance while striking a balance with structural integrity.

In modern additive manufacturing (AM) environments, parts are produced with a single grain size across the whole part, regardless of the localized mechanical properties and/or operating conditions. Generally, the finer the grain size, the better the strength/fatigue properties of the part, and the coarser the grain size, the better the performance against creep (e.g., deformation of material under stress and temperature) and other stress. Parts subject to lower operating temperatures are generally preferred to have finer grain sizes to increase strength/fatigue properties, while parts subject to higher operating temperatures are generally preferred to have coarser grain sizes for better creep performance. During the AM process, parts are often formed with a compromise between strength/fatigue properties and creep performance, which reduces overall performance of the part.

The process of dual heat treatment (DHT) attempts to solve this problem by subjecting a part, post build, to an additional heat source which varies across the length of the part to achieve varying grain sizes. However, this process is flawed in applications where the part is thin and structural, where the DHT process subjects these parts to significant risk of hoop cracks forming from stress and weakening the part.

In cases of aircraft turbine engines, engine hot section components present some locations at which the part is exposed to high temperatures (e.g., greater than 1,000° F.) where better creep performance is desired. Additionally, aircraft turbine engine casings, especially low-pressure turbine (LPT) casings, are orders of magnitude thinner than any successful DHT part consisting of varying grain sizes. For greater performance, LPT casings can benefit from tailored grain sizes based on localized mechanical properties and/or operating conditions.

As such, there exists a need for an additive manufacturing environment that provides tailored grain sizes to a part of all sizes, but more specifically, to parts that are subject to extreme operating conditions. The present disclosure provides such a solution, among other things.

FIG. 1A is a block diagram of an example additive manufacturing infrastructure or environment 100. The example additive manufacturing environment 100 includes an additive manufacturing machine 110, example controller circuitry 120, a post-processing device 130, and a part 140. The additive manufacturing machine 110 includes a device for depositing and/or melting an additive material in layers to form an example part 140. The part 140 can be any 3D structure created by the additive manufacturing machine 110 during the AM process. In some examples, the additive manufacturing machine 110 can utilize directed energy deposition (DED) to deposit a wire of additive material that is heated and moldable, allowing the additive manufacturing machine 110 to control the deposition of the material in wire form to create the part 140. In some examples, the additive manufacturing machine 110 can utilize Direct Metal Laser Melting (DMLM), or any other form of laser melting process, to heat a metal powder into a melt pool that is then formed into the example part 140. The additive material may consist of any material that can be used during the AM process, such as steel, titanium, aluminum, alloys of many combinations, etc., and may come in the form of a wire or powder, for example.

The example controller circuitry 120 of the additive manufacturing environment 100 of FIG. 1A includes computer readable instructions to build the part 140 based on a computer model. The example controller circuitry of FIG. 1A can be instantiated (e.g., creating an instance of, bring into being for any length of time, materialize, implement, etc.) by processor circuitry such as a central processing unit executing instructions. Additionally, or alternatively, the example controller circuitry of FIG. 1A can be instantiated (e.g., creating an instance of, bring into being for any length of time, materialize, implement, etc.) by an ASIC or an FPGA structured to perform operations corresponding to the instructions. It should be understood that some or all of the circuitry of FIG. 1A may, thus, be instantiated at the same or different times. Some or all of the circuitry can be instantiated, for example, in one or more threads executing concurrently on hardware and/or in series on hardware. Moreover, in some examples, some or all of the circuitry of FIG. 1A can be implemented by microprocessor circuitry executing instructions to implement one or more virtual machines and/or containers.

The example controller circuitry 120 of the illustrated example of FIG. 1A instructs the additive manufacturing machine 110 to build the part 140 based on a computer model and/or other schematic, instruction, configuration, etc. In some examples, the example controller circuitry 120 is instantiated by processor circuitry executing example controller instructions and/or configured to perform operations such as those represented by the flowchart of FIGS. 7 and/or 8 to take a 3D-modelled part from computer software and build the part 140 based on that computer model with the tailored grain size solution desired.

In some examples, the example additive manufacturing environment 100 includes means for building the part 140 based on a computer model. For example, the means for building the part 140 based on a computer model can be implemented by example controller circuitry 120. In some examples, the example controller circuitry 120 can be instantiated by processor circuitry such as the example processor circuitry 1012 of FIG. 10.

In some examples, the means for building the part 140 based on a computer model includes means for performing a simulation of mechanical properties of the part 140 to obtain tailored grain sizes. For example, the means for performing a simulation of mechanical properties of the part 140 to obtain tailored grain sizes can be implemented by example controller circuitry 120. In some examples, the example controller circuitry 120 can be instantiated by processor circuitry such as the example processor circuitry 1012 of FIG. 10.

In some examples, the means for building also includes means for instructing the additive manufacturing machine 110 to build the part 140 based on the computer model. For example, the means for instructing the additive manufacturing machine 110 to build the part 140 can be implemented by example controller circuitry 120. In some examples, the example controller circuitry 120 can be instantiated by processor circuitry such as the example processor circuitry 1012 of FIG. 10.

Figure 1B:
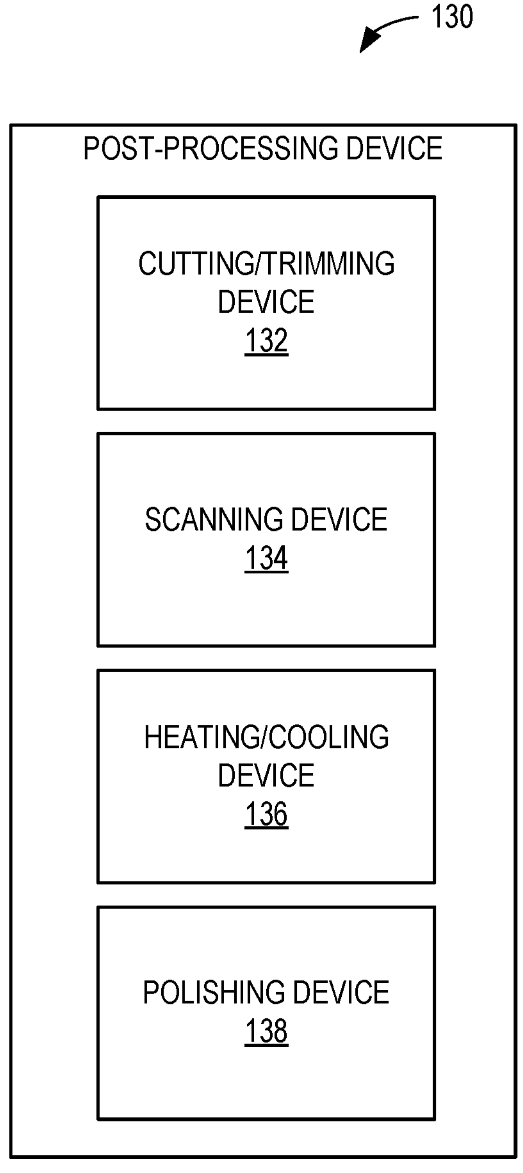
FIG. 1B is a block diagram of an example post-processing device.

FIG. 1B is a block diagram of an example post-processing device 130. The post-processing device 130 can include a cutting/trimming device 132, a scanning device 134, a heating/cooling device 136, and a polishing device 138. In some examples, additional devices may be included in the post-processing device 130 for the purpose of transforming the built part produced by the additive manufacturing machine 110 into the final or completed part 140. In some examples, after the build is complete, some form of post-processing is used to turn the built part into the final or completed part 140 that can be output and used (e.g., a fan case for an engine, etc.). Such post-processing can be performed by the post-processing device 130. In some examples, the example additive manufacturing environment 100 includes means for post-processing the built part prior to outputting the part 140. For example, the means for post-processing can be implemented by the example post-processing device 130. In some examples, the example post-processing device 130 can be a separate machine/component that may post-process the built part.

The cutting/trimming device 132 of the illustrated example of FIG. 1B trims away excess additive material from the built part produced by the additive manufacturing machine 110. In some examples, the additive manufacturing machine 110 leaves excess additive material during the build as part of the building process (e.g., structural support to lay/melt a layer of additive material) that is not desired for the final part 140. In such an example, the excess additive material is to be trimmed/cut off to transform the built part into the usable, final part 140. In some examples, the post-processing device 130 implements means for trimming and/or cutting away excess material from the built part. The means for trimming and/or cutting away excess material can be implemented by the cutting/trimming device 132.

The scanning device 134 of the illustrated example of FIG. 1B scans the built part for structural deficiencies and/or build errors. In some examples, the additive manufacturing machine 110 can produce insufficient structural components and/or fail in the building process. In such an example, the scanning device 134 can scan the built part (through the use of scanners, optical devices, sensors, etc.) for those insufficient structural components and/or errors. The result of the scan can include an output to an operator and/or the computer model that the structural inefficiencies and/or errors exist such that intervention, rebuilding, another form of post-processing, etc. is desired. In some examples, the post-processing device 130 implements means for scanning the built part for deficiencies and/or build errors. The means for scanning the built part for deficiencies and/or errors can be implemented by the scanning device 134.

The heating/cooling device 136 of the illustrated example of FIG. 1B subjects the built part to an additional heat source and/or subjects the built part to a quenching process/cooling source once the build is complete. In some examples, the built part may desire an additional heat treatment process to reinforce the built part's structural integrity (e.g., reinforcing strength/fatigue performance). In some examples, the built part may desire a cooling source to cool once the build is complete. In other examples, the built part may be subjected to both the heat source and the cooling source once the build is complete. In some examples, the post-processing device 130 implements means for heating and/or cooling the built part. The means for heating and/or cooling the built part can be implemented by the heating/cooling device 136.

The polishing device 138 of the illustrated example of FIG. 1B polishes the built part to create a smooth surface for the final part 140. In some examples, the additive manufacturing machine 110 creates rough/uneven edges around the surface of the built part that is unsuitable for the final part 140 and its desired application. In such an example, the polishing device 138 can smooth the surface of the built part such that the final part 140 is suitable for use. In some examples, the post-processing device 138 implements means for polishing the built part. The means for polishing the built part can be implemented by the polishing device 138.

Any one of or combination of the cutting/trimming device 132, scanning device 134, heating/cooling device 136, and the polishing device 138 can be used by the post-processing device 130. Additionally, or alternatively, any form of post-processing the built part may be subject to in order to output a fully functional component may be used interchangeably herein.

Figure 1C:
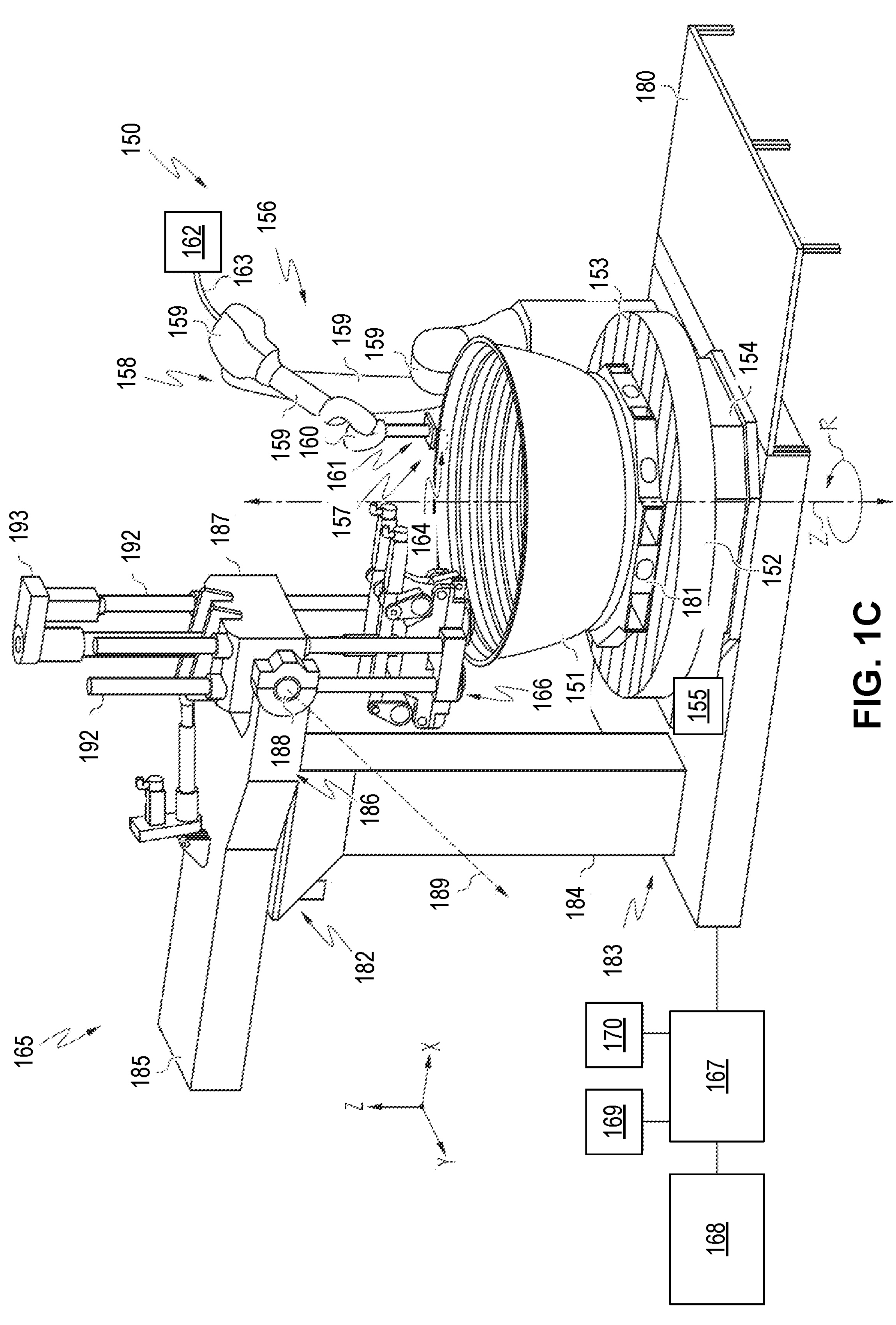
FIG. 1C illustrates an example DED additive manufacturing system.

FIG. 1C illustrates an example DED additive manufacturing system 150 (hereinafter, the system 150). The system 150 is configured to construct or build a component 151 from a feedstock material. In the illustrated example of FIG. 1C, the component 151 is a cylindrically shaped component, but in other examples, the component 151 may have a different geometry.

As illustrated in the example of FIG. 1C, the system 150 includes a build table 152. At least a portion of the build table is configured to rotate about a vertical axis Z of the build table 152, thereby rotating the component 151 supported on the build table. Thus, the build table 152 is a rotary build table. In particular, the build table 152 defines a build surface 153 on which the component 151 is built and supported. Here, the build surface 153 is oriented in the X-Y plane and is thus a horizontal build surface, but the build surface 153 may have other orientations. In the illustrated example, the build table 152 is disposed on a base 154. The base 154 may include an actuator 155 that moves (rotates) the build table 152 about the vertical axis Z in a clockwise or counterclockwise rotation direction. In the illustrated example, the actuator 155 rotates the build table 152 in a counterclockwise direction R about the vertical axis Z. Also, as hereinafter described, the actuator 155 rotates the build table 152 at a variable rotation speed. In some examples, the base 154 is further configured to move (translate) the build table 152 vertically along the vertical axis Z (e.g., in the Z-dimension depicted in FIG. 1C).

In the illustrated example of FIG. 1C, a pallet 181 is provided on the build surface 153 of the build table 152 and the component 151 is built on the pallet 181. As such, upon completion of manufacturing the component 151, a forklift or other material handling equipment may be utilized to engage the pallet 181 and remove the component 151 when finished from the build table 152. Where utilized, the pallet 181 may be selectively secured to the build table 152, for example, with mechanical fasteners and/or a locking system.

The system 150 also includes the additive manufacturing machine 110. The additive manufacturing machine 110 has a deposition head 157 through which a stream of feedstock material may be deposited to fabricate the component 151. As described herein, the feedstock material is melted and output from the deposition head 157, as a stream of melted feedstock material, at a deposition rate. The additive manufacturing machine 110 includes a structure that adjustably and movably supports the deposition head 157. In the illustrated example, the additive manufacturing machine 110 includes a robotic arm 158 comprising a plurality of links 159 that may articulate relative to each other so as to adjust the position of the deposition head 157 which is supported on a distal most link 160 of the plurality of links 159. Accordingly, it should be understood that the deposition head 157 and the build table 152 are movable relative to each other. For example, the robotic arm 158 may include one or more actuators that rotate the links 159,160 of the robotic arm relative to one another so as to move the robotic arm 158 and the deposition head 157 supported thereon relative to the build table 152. It will be appreciated that the robotic arm 158 may have various other configurations for moving and adjusting position of the deposition head 157 in multiple degrees of freedom without departing from the present disclosure.

The additive manufacturing machine 110 includes an energy source 161 and a material source 162. The material source 162 is configured to convey the feedstock material to the deposition head 157 where it is deposited on the build table 152. In the illustrated embodiment, the material source 162 is a material spool and feeder system configured to convey a wire 163 (e.g., a metal or polymer-based wire) to the deposition head 157. Thus, the material source 162 may house the wire 163 that is fed to the deposition head 157. For example, the wire 163 may be routed externally of the robotic arm 158 to the deposition head 157 or through an internal cavity of the robotic arm 158 that connects to the deposition head 157. In other examples, rather than being a material spool and feeder system configured to convey the wire 163, the material source 162 may comprise a pressurized powder source that conveys a pressurized stream of powder feedstock material to one or more material delivery devices (e.g., nozzles, valves, or the like) of the deposition head 157. Any suitable feedstock material capable of being used in DED processes may be used consistent with the present disclosure.

The energy source 161 may take various forms depending on the implementation. In the illustrated example, the energy source 161 is a plasma transferred arc heat source. In other examples, the energy source 161 may include a laser source and optics configured to direct a laser beam having a desired energy density to the build surface 153 of the build table 152. In some examples, the energy source 161 may include an electron emitter connected to a power supply and at least one focusing coil configured to direct an electron beam to the component 151 being constructed on the build surface 153 of the build table 152. In such examples, the build table 152 may be placed in a build chamber (not depicted) under a vacuum or having an oxygen-reduced environment. However, the energy source 161 may take various other forms, such as a plasma source, an electron beam source, etc. In some examples, the energy source 161 may comprise multiple energy sources, such as a laser source and a plasma transferred arc.

It should be understood that the system 150 may include any number of energy sources and material sources in accordance with the present disclosure. Additionally, feedstock material from the material source 162 may be routed to the deposition head 157 in various ways for emission onto the build table 152. For example, in some examples, the wire 163 from the material source 162 may be divided into two or more material feeds that are routed through the robotic arm 158 into the deposition head 157. Each material feed may exit the deposition head 157 at a separate delivery nozzle as a material stream.

In operation, one or more streams of feedstock material are fed into a path of an energy beam from the energy source 161 and emitted by the deposition head 157 as a stream of melted feedstock material. In particular, at points of overlap between the energy beam and the stream(s) of feedstock material where the energy beam possesses the requisite energy density, the energy may heat the feedstock material to a sufficient extent to form a melt pool 164 on the build surface 153. Melted feedstock material may continuously be fed through and deposited from the deposition head 157 such that the melt pool 164 forms a pattern corresponding to the movement pattern of the deposition head 157 and the build table 152. Movements of the deposition head 157 and the build table 152 may be determined based on a desired shape of the component 151 being built such that, as the melt pool 164 cools, the feedstock material hardens to form a portion of the component 151. For example, rotation of the build table 152 about the vertical axis Z as the deposition head 157 deposits the melt pool 164 results in a circular shaped stream of melted feedstock material that, as the build table 152 continuously rotates over time, will layer upon itself and build a cylindrical shaped component, such as the component 151. Also, the robotic arm 158 may position the deposition head 157 radially towards or away from the vertical axis Z so as to create a non-circular shaped component with a varying size and diameter as illustrated.

The system 150 further includes a force application device 165. The force application device 165 is positioned proximate the additive manufacturing machine 110 and operable to continuously apply a force to the deposited feedstock material which forms the component 151. As described herein, the force application device 165 is configured to apply a force to the component 151 during (or simultaneously with) a deposition phase where the additive manufacturing machine 110 is depositing the stream of melted feedstock material to build the component 151, such that the force application device 165 may apply a force to a portion of the deposited stream of melted feedstock material that is downstream of the deposition assembly 151 while the additive manufacturing machine 110 continues to deposit the stream of melted feedstock material. In the illustrated embodiment, the force application device 165 includes at least one actuator and a load source 166, an alternative configuration of the load source herein described with reference to FIGS. 2 and/or 3.

Generally, the at least one actuator is configured to move and manipulate orientation of the load source 166 relative to the portion of the component 151 to which compressive load is to be applied. The load source 166 applies a force to the deposited material to introduce the required strain level in the deposited layer and/or improve mechanical properties of the component 151, for example, grain refinement and recrystallization.

As described herein, the robotic arm 158 is operable to position the deposition head 157 in close proximity of the load source 166 and/or the force application device 165 is operable to position the load source 166 in close proximity of the deposition head 157. The distance between the load source 166 and the deposition head 157 may be increased if cold rolling is intended, for example, by rotating the build table 152 in an opposite clockwise direction. In this manner, it is possible to operate the deposition head 157 to deposit melted feedstock material in the melt pool 164 while the load source 166 applies the compressive load to the component 151, with the load source 166 trailing the deposition head 157 such that the load source 166 applies load to previously deposited material a short time thereafter depending on the rotation speed of the build table 152. Thus, the force application device 165 may apply a compressive load to the component 151 at the same time as the deposition head 157 is creating the melt pool 164, at least in close proximity to the melt pool 164 of the component 151. Not only does this decrease machine cycle time, but also allows the compressive load to be applied to the component 151 at a constant temperature and at a temperature suitable to provide the component 151 with forge-like qualities. A grain refinement mechanism responsible for the forge-like properties may be utilized to provide static or dynamic recrystallization. It should be appreciated that cold rolling is capable of producing static recrystallization when the material is first strained at an ambient temperature and then re-heated with a consequent grain refinement. The re-heat in DED is provided by the most recent layer deposition to the layer(s) below.

In some examples, the system may further include a controller 167. The controller 167 may be communicatively coupled to the build table 152, the additive manufacturing machine 110, the force application device 165, and/or the material source 162. Thus, the controller may be in communication with the base 154, the robotic arm 158, and/or the force application device 165 so as to control operation of the same. For example, the controller 167 may include a processor and memory storing computer readable instructions which, when executed by the processor, dynamically controls rotation direction and/or rotation speed of the build table 152 about the vertical axis Z, vertical translation of the build table 152 along the vertical axis Z, position and orientation of the deposition head 157 in space via the robotic arm 158, position and orientation of the load source 166 in space, and/or the magnitude of compressive load applied by the load source 166. The controller 167 may also be configured to control the feed rate at which the material source 162 feeds or supplies the feedstock material to the deposition head 157 and/or control the deposition rate at which the stream of melted feedstock material is output from the deposition head 157.

In some examples, the system 150 may have various sensors communicatively coupled to the controller 167, and the controller 167 may utilize data communicated from the various sensors to control operation of the build table 152, the additive manufacturing machine 110, the force application device 165, and/or the material source 162 as may be desired for fabricating the component 151. In some examples, a sensor system 168 may be provided that scans the component 151 so as to measure the dimensions of the component 151 as it is being formed. For example, lasers or cameras could be utilized to monitor the geometry of the component 151 and control the orientation of the additive manufacturing machine 110 and/or the force application device 165 based on that sensed data.

In some examples, the system 150 includes one or more temperature sensors 169 and/or one or more stress sensors 170. The temperature sensor 169 may be configured to measure a surface temperature of the layer of feedstock material deposited via the deposition head 157 inside and/or outside of the melt pool 164. In some examples, the temperature sensor 169 may include at least one pyrometer or thermal camera configured to check the actual surface temperature of the deposited feedstock material. The temperature sensor 169 is communicably coupled to the controller 167 (e.g., associated with a remainder of the system 150) which includes control logic that evaluates the measurements of the temperature sensor 169. In some examples, the controller 167 is configured to determine if a temperature of the feedstock material is suitable for a counterbalancing treatment via the load source 166. For example, a suitable temperature range for compressive load treatments may be determined based on material properties (e.g., plasticity, coefficient of thermal expansion, and the like) associated with the feedstock material deposited via the deposition head 157. In some examples, the controller 167 is configured to control relative position between the deposition head 157 and the load source 166 based on the measurements of the temperature sensor 169. For example, the controller 167 may cause movement of the deposition head 157 nearer or further from the load source 166 so as to ensure that the compressive load is being applied to material having a desired constant temperature. If a measurement of the temperature sensor 169 indicates that a previously deposited feedstock material is not suitable for compression or not uniform with previously compressed feedstock material, the controller 167 may transmit control signals to the actuator 155 of the build table 152 to vary rotation speed and/or transmit control signals to the robotic arm 158 to adjust a positioning of the deposition head 157.

In some examples, the stress sensor 170 may be configured to measure a residual stress in the layer of feedstock material after the compression treatments are performed via the load source 166. The stress sensor 170 is communicably coupled to the controller 167 (e.g., associated with a remainder of the system 150) which includes control logic that evaluates the readings of the stress sensor 170. The stress sensor 170 may include an ultrasonic stress sensor or the like. In some examples, the controller 167 may be configured to determine if the stress measurements obtained via the stress sensor 170 are within an acceptable threshold to ensure high build quality. If the measurements are outside of the threshold, the controller 167 may modify various parameters of the build process. In some examples, if an unacceptable amount of residual stress is detected, the controller 167 may modify operation of the force application device 165 (e.g., by modifying the load application parameters such as force magnitude, and the like) to correct for the residual stress in the component 151 being outside of an acceptable range, wherein residual stress may be the combination of thermal stress given by the cooling after deposition and the mechanical stress caused by compression. In some examples, if an unacceptable amount of residual stress is detected, the controller 167 may modify various operating parameters associated with the deposition head 157 (e.g., energy beam power, movement speed, material feed rate) to reduce residual stress in the component 151.

In the illustrated example of FIG. 1C, the deposition head 157 deposits feedstock material to fabricate the component 151 on the build table 152 while the build table 152 rotates in the counterclockwise direction R about the vertical axis Z and, as the build table 152 continues to rotate the component 151 in the counterclockwise direction R, the feedstock material previously deposited by the deposition head 157 will encounter the load source 166 after being deposited from the deposition head 157. Thus, in the illustrated example, the deposition head 157 acts on a particular portion of the component 151 before the load source 166 acts on that particular portion of the component and, similarly, the load source 166 acts on a particular portion of the component 151 after the deposition head 157 has acted on that particular portion of the component 151. Stated differently, because the build table 152 rotates in the counterclockwise direction R in the illustrated embodiment, the deposition head 157 is positioned before (or upstream of) the load source 166 and the load source 166 is positioned after (or downstream of) the deposition head 157. In some examples, the temperature sensor 169 may be positioned before the load source 166 to ensure that the mechanical load is applied at the correct temperature and the stress sensor 170 may be positioned after the load source 166 to determine if the resulting stress is at a desired level (e.g., near zero for a stress-relieving treatment or a negative value if a counterbalancing treatment is being performed to promote grain refinement). In some examples, the temperature sensor 169 may be provided on the additive manufacturing machine 110, for example, proximate the deposition head 157, so as to accurately measure temperature of the melted feedstock material being deposited therefrom. In some examples, the temperature sensor 169 may be provided proximate the load source 166 in addition to or in lieu of the temperature sensor 169 placed proximate the deposition head 157.

By monitoring the surface temperature of the component 151 in close proximity of the load source 166, the system 150 is able to help ensure application of compressive load to portions of the component 151 having substantially uniform temperatures while preceding portions of the stream of melted feedstock material are being simultaneously deposited by the deposition head 157.

In the illustrated example, the system 150 further includes a platform 180 on which the other components of the system 150 are mounted. It should be appreciated, however, that a platform 180 is not required, and one or more of the other components of the system 150 may be secured to the ground surface or floor.

Also, in the illustrated example of FIG. 1C, the force application device 165 includes a support structure 184 and a positioning arm 185. The support structure 184 includes an upper end 182 and a lower end 183 that is opposite of the upper end 182. The positioning arm 185 is slidably attached to the upper end 182 of the support structure 184 such that the positioning arm 185 may translate relative to the support structure 184 (e.g., in the X-dimension). Thus, the force application device 165 may include one or more actuators (not shown) for causing translation of the positioning arm 185 in the X-dimension.

The positioning arm 185 includes a clevis 186 at one end thereof. The force application device 165 further includes a tang 187, which is rotationally supported within the clevis 186 of the positioning arm 185, such that the tang 187 may rotate within and relative to the clevis 186 of the positioning arm 185. In particular, the tang 187 includes a pair of shaft ends or pins 188 protruding from opposite sides of the tang 187, which are retained within the openings of the clevis 186, and the pins 188 may rotate within their respective openings of the clevis 186 such that the tang 187 may rotate about an axis 189 defined by the pins 188.

The tang 187 supports the load source 166 via a plurality of slide members 192 and a linear actuator 193. The slide members 192 are fixed to the load source 166 and extend upward therefrom to the tang 187, which includes a plurality of corresponding slots or openings sized to receive the slide members 192. The slide members 192 may slide within the corresponding slots or openings of the tang 187 such that the load source 166 may slide towards or away from the tang 187. The linear actuator 193 is coupled to the tang 187 and includes a drive rod (obscured) that is coupled to the load source 166. In one example, the drive rod is configured as a screw that is received within a correspondingly threaded bore (obscured from view in the example of FIG. 1C) provided on the load source 166. Actuation of the linear actuator 193 thereby causes the load source 166 to translate towards or away from the tang 187, for example, in the Z-dimension. Translation of the load source 166 away from the tang 187 (and towards the component 151) may result in application of compression on the component 151. Translation of the load source 166 towards the tang 187 (and away from the component 151) may be useful to position the load source 166 as needed to accommodate growth of the component 151 as it is built.

Figure 2:
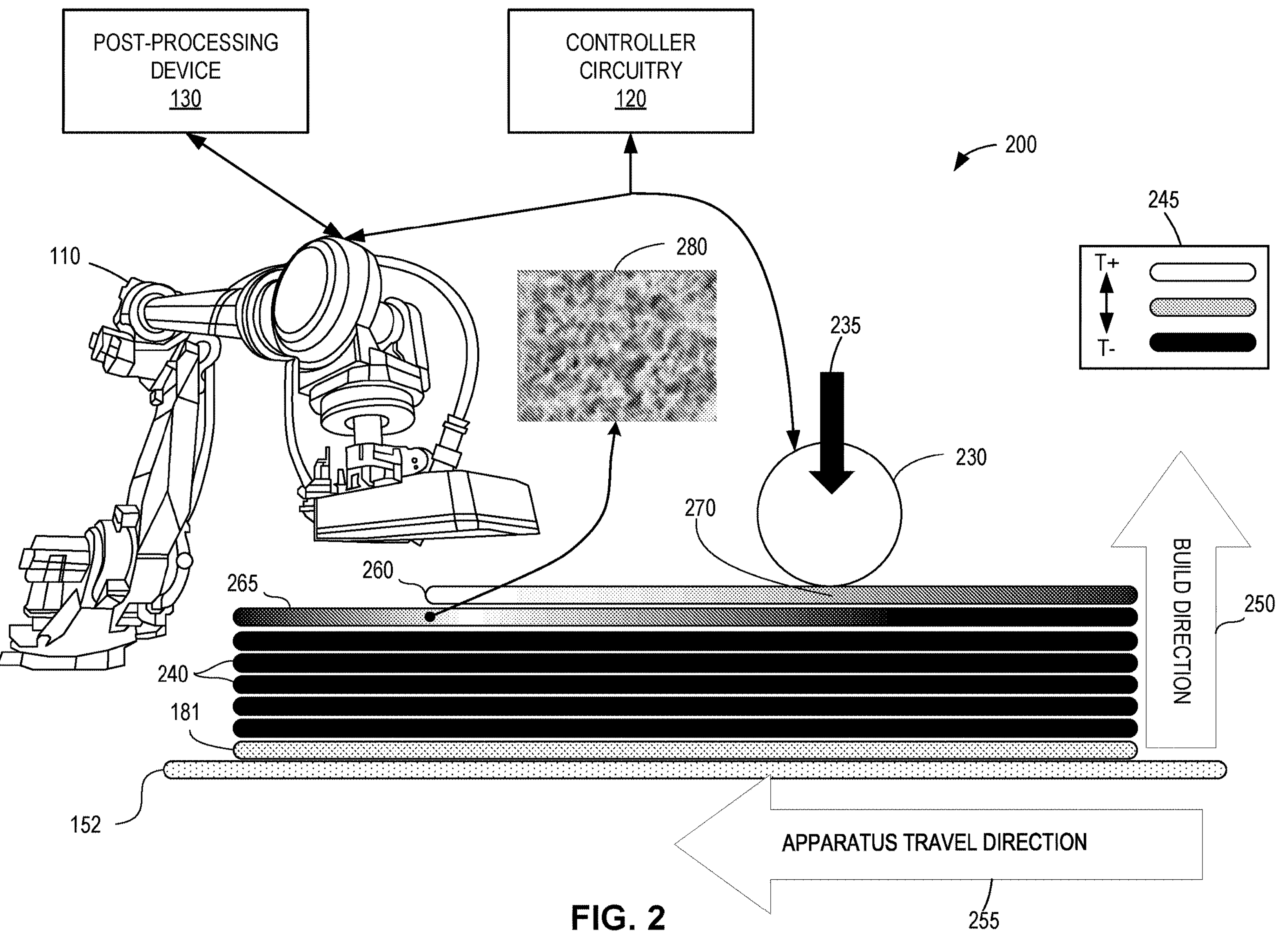
FIG. 2 is an operational illustration of the example additive manufacturing environment of FIG. 1A.

FIG. 2 is an example additive manufacturing operation 200 of the example additive manufacturing environment 100 of FIG. 1A. The example additive manufacturing operation 200 of the illustrated example of FIG. 2 includes the additive manufacturing machine 110, the controller circuitry 120, the post-processing device 130, the build table 152, the pallet 181, and a top roller 230 (hereafter also referred to as a force application device 165), building the part 140 in a plurality of layers 240, 260. The additive manufacturing machine 110 operably communicates and/or operates in conjunction with the controller circuitry 120 and the post-processing device 130 of FIG. 1A.

The build table 152 of the example additive manufacturing operation 200 of FIG. 2 is a surface on which the part 140 is built from a supply of additive material. In some examples, the additive manufacturing machine 110 begins building the part 140 by creating (e.g., depositing and/or otherwise forming from pellets or grains of additive material) a first layer of additive material on the pallet 181. Subsequent layers are laid and/or otherwise formed on top of the first layer until the part 140 is completed, the part 140 including a plurality of layers 240. In some examples, the build table 152 rotates while the additive machine 110 is depositing additive material.

The top roller 230 of the example additive manufacturing operation 200 of FIG. 2 provides a force (e.g., a plastic deformational force) 235 on an in-progress layer 260 of material being deposited by the additive manufacturing machine 110 at a force application point 270. In some examples, each of the plurality of layers 240 is deformed (e.g., plastically deformed to modify a mechanical property of the material resulting in a refinement of grain size) by the top roller 230 applying the force 235 at the force application point 270 on the in-progress layer 260. The force 235 is a mechanism to control the grain size in a single layer of material, where increasing the force 235 applied by the roller 230 increases the deformation which results in a finer or smaller grain size in the material of the in-progress layer 260 and/or layer(s) 240, 265 underneath the in-progress layer 260.

While the examples included herein refer to the force 235 applied to the layer(s) 240, 260, 265 of material as a plastic force, the present disclosure is not limited to a plastic force application. One or more of a tensile, compression, shear, bending, torsion, and/or other force can be applied to the layer of material 240, 260, 265 to customize and/or otherwise adjust a grain size of the additive material as described herein. The force 235 applied to the layer(s) 240, 260, 265 can be any alternative force application device 165 that can produce a mechanical load (e.g., compressive force, shear force, etc.) such as a hammer peening device, laser peening device, etc.

The layer temperature legend 245 of the illustrated example of FIG. 2 shows the temperature variations in the part 140 as it is being built. As the additive manufacturing machine 110 deposits each layer, it follows a vertical build direction 250, which indicates that the part 140 is built in the vertical direction (with respect to Earth), and each layer is deposited by the additive manufacturing machine 110 in an apparatus travel direction 255. As the additive manufacturing machine 110 deposits the in-progress layer 260, the additive manufacturing machine 110 heats the preceding layer 265 of material, which forms an equiaxed structure 280 (e.g., the grains or crystals within the layer of material have approximately the same dimensions in all directions) furthering the control over the grain sizes within the preceding layer 265 of material. The top roller 230 then applies the force 235 to the force application point 270 on the in-progress layer 260. In some examples, achieving the tailored grain size as described above can also be attained with an additive forging technique utilizing an in-situ forging process, or any other process of controlling the local deposition of material, the local plastic deformation, and the temperature.

In some examples, the temperature applied by the additive manufacturing machine 110 is variable based on instructions provided by the example controller circuitry 120 (which is further explained in reference to FIGS. 7 and/or 8), and the force 235 is also variable to control an amount of recrystallization (e.g., an amount of deformed grains in a material that are replaced by a new set of defect-reduced grains that nucleate and grow until the original grains have been consumed) within the layer of material. Further information on the recrystallization of a layer of material is discussed in reference to FIG. 5. The force 235 applied by the top roller 230 can vary within an acceptable range based on the moldability of the additive material. In some examples, the force 235 applied can range from 50 Kilonewtons (kN) to 250 kN. In other examples, the force 235 may fall outside of the 50-250 kN range.

The combination of the force 235 and the heating of the preceding layer 265 to form the equiaxed structure 280 allows for the additive manufacturing environment 100 to tailor the grain size within that layer of material. As the additive manufacturing machine 110 deposits or melts a first layer of material, the additive manufacturing machine 110 moves in the apparatus travel direction 255. Following the depositing or melting of the first layer of material, the top roller 235 provides the force 235 on the layer that was just deposited/melted. Once the first layer is completed, the additive manufacturing machine 110 moves to a second layer of material (e.g., the in-progress layer 260) and performs the same deposition/melting process as the first layer of material. The top roller 230 also applies the force 235 to the second layer of material. As the additive manufacturing machine 110 moves over the first layer by depositing/melting the second layer, the first layer is heated up by the additive manufacturing machine 110 (represented by lighter colors—e.g., legend 245). The heat applied to the first layer of material is variable based on instructions provided by the controller circuitry 120, where reducing the temperature may, in some examples, be beneficial to creating the desired grain size. At this point, the first layer of material has been subjected to a force 235 and then subsequently a heat treatment. This process forms the equiaxed structure 280 which represents the tailored grain size solution. As each layer is formed and the additive manufacturing machine 110 moves away from the material laid/melted, the temperature of the previous layers 240, 265 cools down and hardens into the part 140 (represented by darker colors—reference legend 245). In some examples, the controller circuitry 120 implements means for producing the desired grain size. The means for producing the desired grain size also includes means for modifying the force 235 applied by the top roller 230.

In current manufacturing processes, if a portion of a component needs a larger grain size, the entire component must be manufactured at that larger grain size. This uniform manufacture at the larger grain size adds unnecessary weight to the component because the component with a larger grain size results in a larger manufactured component to maintain strength properties. Additionally, the current DHT process used to vary grain sizes within a single component is not applicable to structures such as a LPT casing where the thickness of the component is small (e.g., less than 0.75 inches in thickness). The disclosed additive manufacturing environment 100 allows for the component to have areas/zones/regions with a different grain size, which allows for reduction in weight while still increasing structural performance across the entire component. The disclosed additive manufacturing environment 100 also enables the creation of structures of varying geometries while still maintaining the ability to vary the grain size within individual layers of additive material.

In some examples, the grain size variation throughout the part 140 may include non-continuous grain size changes (e.g., the grain size throughout the part 140 is not gradually changed and contains non-linear grain size changes). In other examples, the grain size variation may be continuous, such that the grain size is gradually increased or decreased throughout portions of the part 140. Any variation of differing grain sizes can be used through the additive manufacturing environment 100 disclosed herein.

In the examples disclosed herein, the part 140 may be made of a nickel-based alloy, such as waspaloy, etc. In the example of waspaloy, the creep temperature threshold is 1200° F. In other examples, the part 140 may be made of a nickel-chromium-molybdenum alloy, such as inco718, etc. In the example of inco718, the creep temperature threshold is 1000° F. As such, the creep temperature threshold varies with different materials used by the additive manufacturing environment 100, and different grain sizes are desired based on these thresholds.

Figure 3:
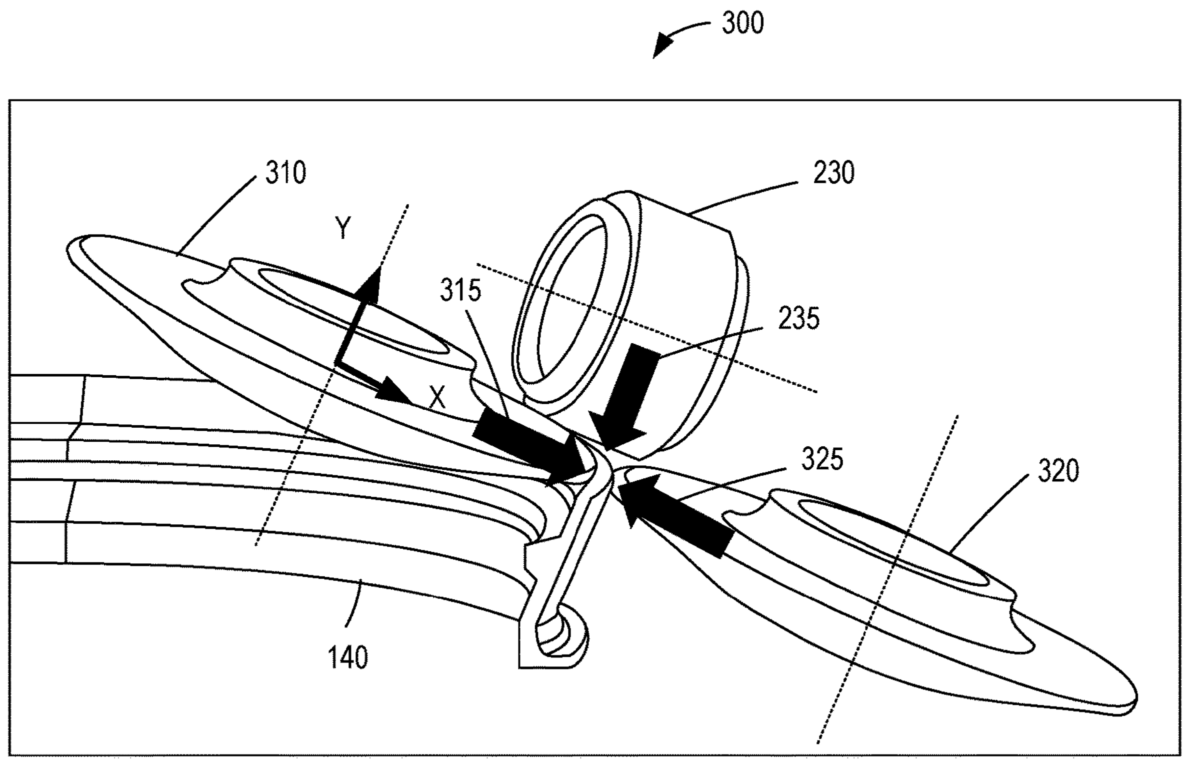
FIG. 3 is a close-up view of an example roller configuration including the example roller of FIG. 2 to provide the force to the deposition of material of FIG. 2.

FIG. 3 is a close-up view of an example force roller device 300 including the top roller 230 to provide the force 235 of FIG. 2. In some examples, such as shown in FIG. 3, the force roller device 300 includes the top roller 230, as well as an internal side roller 310 and an external side roller 320. The top roller 230 provides a downward force (e.g., force 235) to compress the in-progress layer 260 of deposited material, the internal side roller 310 provides an outward force 315 to the side of the in-progress layer 260, and the external side roller 320 provides an inward force 325 to the side of the in-progress layer 260. The presence of the forces in three directions (e.g., force 235, outward force 315, and inward force 325) provides better recrystallization within a single layer of material, which provides more control over the size of the grains within the layer by modifying the equiaxed structure. A larger applied force 235, outward force 315, and/or inward force 325 decreases the grain size more so than a smaller applied force 235, outward force 315, and/or inward force 325. Further, by adding forces in multiple directions, the additive manufacturing environment 100 exerts a greater degree of control over an overall force that is applied from one or more directions to the deposited material. The addition of side forces (e.g., the outward force 315 and the inward force 325) helps to concentrate the overall force applied by reducing deflection/distortion of the top force 235 through the in-progress layer 260, This greater concentration of forces enables smaller grain sizes, reduction in wasted material, etc. Additionally, the addition of side forces enables the additive manufacturing environment 100 to control the grain size in a variety of locations by enabling the controller circuitry 120 and the additive manufacturing machine 110 to selectively control each of the rollers 230, 310, 320 and resulting force(s) applied to the part 140. Additional forces provide greater control over mechanical properties such as tensile strength, shear, torsion, etc.

Figure 4:
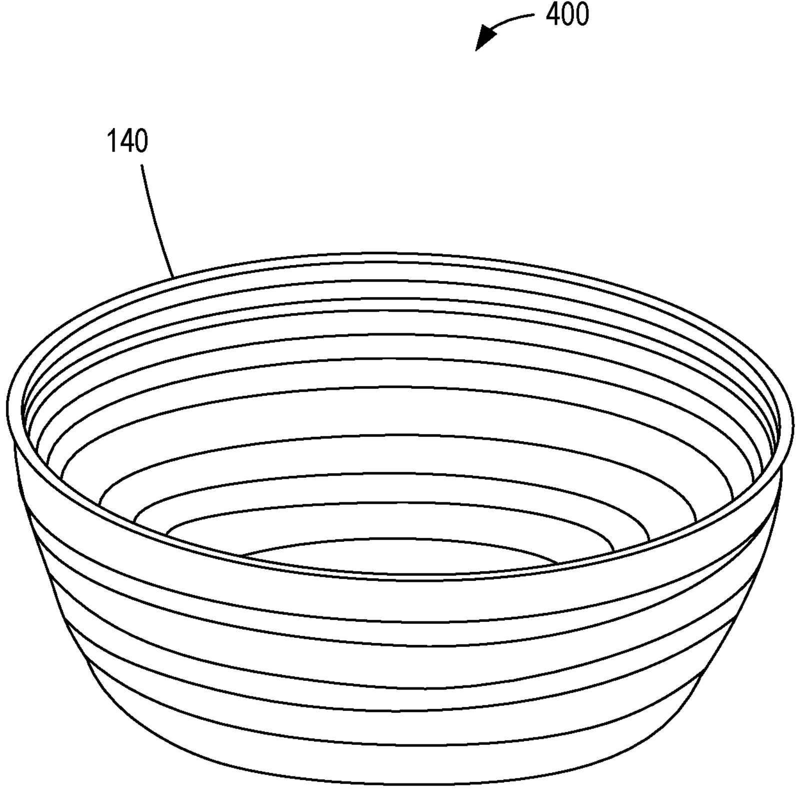
FIG. 4 shows an example low-pressure turbine case formed using the infrastructure of FIG. 1A.

FIG. 4 is an example implementation of the example part 140 as an LPT casing 400 manufactured using the example additive manufacturing environment 100 of FIG. 1A. While FIG. 4 illustrates that the formed part 140 is an LPT casing, the part 140 can also be formed as one or more other additively manufactured components such as a HPT casing, a crankshaft in an internal combustion engine, piston rod, automobile transmission, etc. The example additive manufacturing environment 100 is not limited to the LPT casing example shown in FIG. 4.

Figure 5:
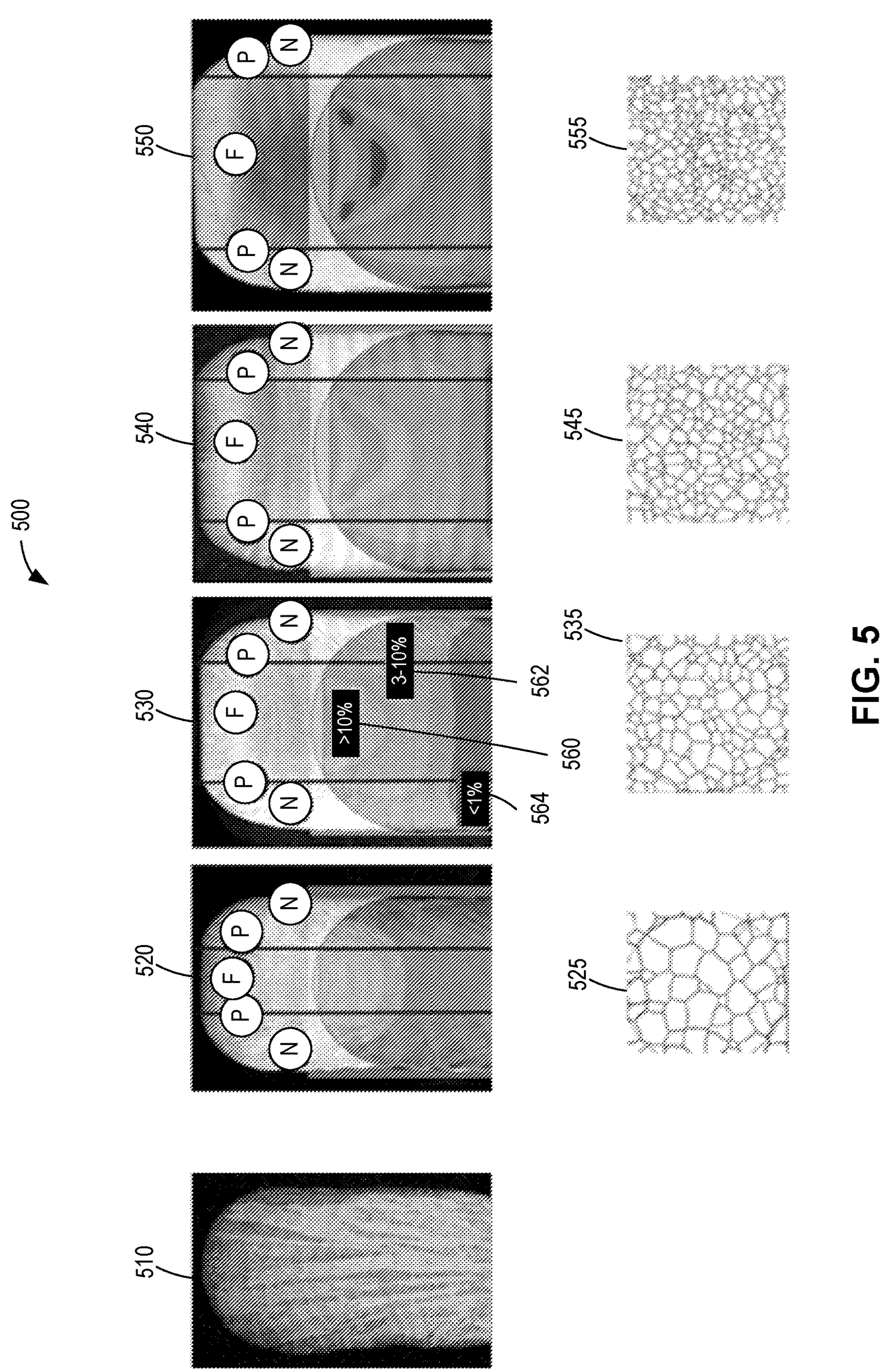
FIG. 5 is a series of microscopic images indicating differing grain sizes based on changes in the plastic deformation of FIG. 2.

FIG. 5 represents a series of microscopic images 500 indicating differing grain sizes based on changes to the force 235 applied to the force application point 270 of the in-progress layer 260 of FIG. 2. As illustrated in FIG. 5, the series of microscopic images 500 were taken by a microscope (e.g., a digital microscope, scanning electron microscope, etc.) of a waspaloy material that had been cut to view the material's grain structure, The series of microscopic images 500 includes a control specimen 510, a specimen rolled at 50 Kilonewtons (kN) 520, a specimen rolled at 100 kN 530, a specimen rolled at 150 kN 540, and a specimen rolled at 200 kN 550. As illustrated on each specimen 520-550, the letter "F" represents a fully recrystallized core, the letter "P" represents a partial recrystallization band, and the letter "N" represents a no recrystallization band. As mentioned above, only the area with a fully recrystallized core may be tailored to achieve the desired grain size solution.

The control specimen 510 of the illustrated example of FIG. 5 indicates that the structure of the layer contains no fully recrystallized regions. Without applying a force to the control specimen 510, no areas of full recrystallization occur, and the control specimen is, thus, not optimal for many desired applications. As such, additional intervention in the AM process is required to form the structure required to tailor the grain size.

The specimen rolled at 50 kN 520 illustrates the presence of a fully recrystallized core. In some examples, the post-processing device 130 can machine away the portions of the specimen rolled at 50 kN 520 to remove the portions of partial recrystallization and no recrystallization. In this example, such removal leaves the fully recrystallized core which contains the ability to modify the tailored grain size solution. A 50 kN grain size 525 indicates a pictorial representation the relative sizes of the grains in the fully recrystallized core. As such, the 50 kN grain size 525 represents an illustration of example grain sizes and do not necessarily represent the actual grain size of the specimen rolled at 50 kN 520. The American Society for Testing and Materials (ASTM) rating for the specimen rolled at 50 kN 520 was measured to be 8.5, where the higher the ASTM rating, the smaller the grain size and thus the finer the grain of the material. The control specimen 510 does not contain an ASTM rating as there is no recrystallization region. Although the ASTM rating is exemplified in the example specimen rolled at 50 kN 520, the rating of 8.5 does not represent the only ASTM rating the specimen could be. As such, any ASTM rating described herein purely represent examples within a specific testing environment. It should be understood that changes to the specific testing environment can result in increases or decreases in the ASTM rating.

The ASTM rating of the material is representative of the fineness and coarseness of the grain size of the material. In some examples, a coarse grain size may be represented by an ASTM rating of 2, which corresponds to an average grain size diameter of around 0.179 millimeters (mm) or 0.007 inches (in). Alternatively, a fine grain size may be represented by an ASTM rating of 8.5, which corresponds to an average grain size diameter of around 0.0189 mm or 0.0007 in. These representations are just examples of what may be considered a fine and a coarse grain size for a material. It should be understood that different fineness and coarseness may be desired based on the material being used and the application in which the part 140 is to be used.

As illustrated in the remaining specimen rolled at 100 kN 530, the specimen rolled at 150 kN 540, and the specimen rolled at 200 kN 550, as the force 235 increases, so do the size of the fully recrystallized core and the ASTM rating for each specimen, respectively. Specifically, the specimen rolled at 100 kN 530, the specimen rolled at 150 kN 540, and the specimen rolled at 200 kN 550 have ratings of 10.4, 11.1, and 11.3, respectively, indicating that increasing the force 235 results in a finer grain which results in a larger ASTM rating. This resulting finer grain size is illustrated by references to a 100 kN grain size 535, a 150 kN grain size 545, and a 200 kN grain size 555 respectively. As illustrated in FIG. 5, as the force 235 increases, the grain size of the specimen decreases, resulting in a finer grain size and better strength/fatigue properties. As mentioned above in reference to the 50 kN grain size 525, the respective grain size illustrations 535, 545, 555 do not necessarily represent the actual grain size of the respective specimen 530, 540, 550. The illustrated example grain sizes 525, 535, 545, 555 are meant to detail decreasing grain sizes overall with increases in the force 235.

As illustrated in FIG. 5, plastic strain percentages vary throughout the structure of a rolled specimen. A high plastic strain percentage 560 indicates the percentage of plastic strain applied to the part compared to the control specimen 510. The high plastic strain percentage 560, which is greater than 10% in this example, correlates to the fully recrystallized core and increases in conjunction with an increase in the force 235. A mid-range plastic strain percentage 562, which is between 3% and 10% in this example, is shown to be on the boundary where the partial recrystallized band exists. A low plastic strain percentage 564, which is less than 1% in this example, is shown to be a point at which no recrystallization has occurred. The greater the force 235, the greater the plastic strain percentage, which indicates a fully recrystallized core.

In some examples, the partial recrystallization band and the no recrystallization band can be reduced or even eliminated by additionally providing a side force to one or both sides of the layer of material using the force roller device 300 of FIG. 3. Eliminating the partial recrystallization band and/or the no recrystallization band is desirable so as to eliminate or reduce the need to machine away the unusable portions of the layer of material. Additionally, in some examples, the force application device 165 may apply the force 235, 315, 325 to create a spot in the part 140 containing a different grain size. As mentioned above, the grain size differences do not have to be continuous/gradual and may include non-continuous portions of the part 140 containing different grain sizes.

Figure 6:
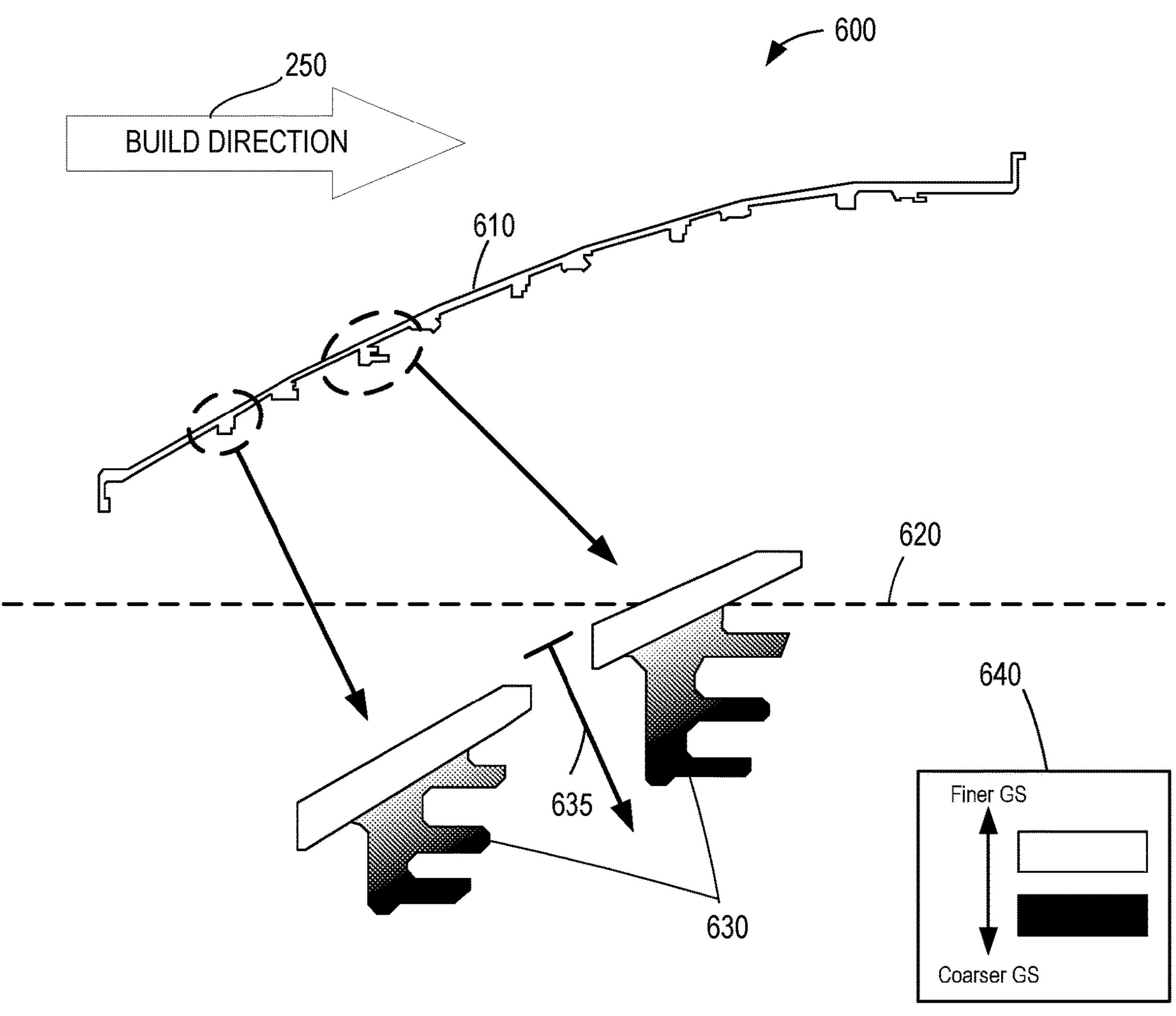
FIG. 6 is a cross-sectional view of the example low-pressure turbine case of FIG. 4, depicting representative, idealized grain sizes in the case based on operating conditions and/or mechanical properties.

FIG. 6 is a cross-sectional view of the example LPT casing 400 of FIG. 4 oriented sideways as indicated by the build direction 250. The cross-sectional view 600 shows the LPT casing 140, which includes an outer edge 610, positioned with respect to an engine centerline axis 620 and an exploded view of example rails 630. In the illustrated example of FIG. 6, the rails 630 can represent assembly connection points for various other components within the LPT casing 400 which may include nozzles, shrouds, etc. The rails 620 also enable the LPT casing 400 to have a more rigid structure by including these various components.

As the example rails 630 extend radially inwards 635 towards the engine centerline axis 620, the example rails 630 are exposed to higher temperatures at least because to the air flowing through the LPT casing 400 (or in some examples, a HPT) is hotter as the air gets farther away from the outer edge 610 (indicated by a darker color—e.g., legend 640). Due to the exposure to the hotter air, coarser grain sizes are desired for improved performance and durability. As the example rails 630 are exposed to higher temperatures (e.g., greater than 1,000° F.), better creep performance from a coarser grain size enables the rails 630 to withstand those higher temperatures by allowing the structure to warp/bend as temperature changes. Likewise, as the example rails 630 are exposed to lower temperatures (indicated by a lighter color—e.g., legend 640), better strength/fatigue properties provided by a finer grain size enable the rails 630 to have a stronger structure. In some examples, the additive manufacturing environment 100 provides a tailored grain size solution that varies across a part or component such that the material composition is targeted for strength/fatigue versus creep performance depending upon an area of the part, which increases the overall performance of the part for its target application (e.g., for use in a low-pressure turbine, etc.). That is, grain size is determined on a region-by-region basis for a part so that the grain size is tailored to the operating conditions of the respective region of the part 140 geometry.

Figure 7:
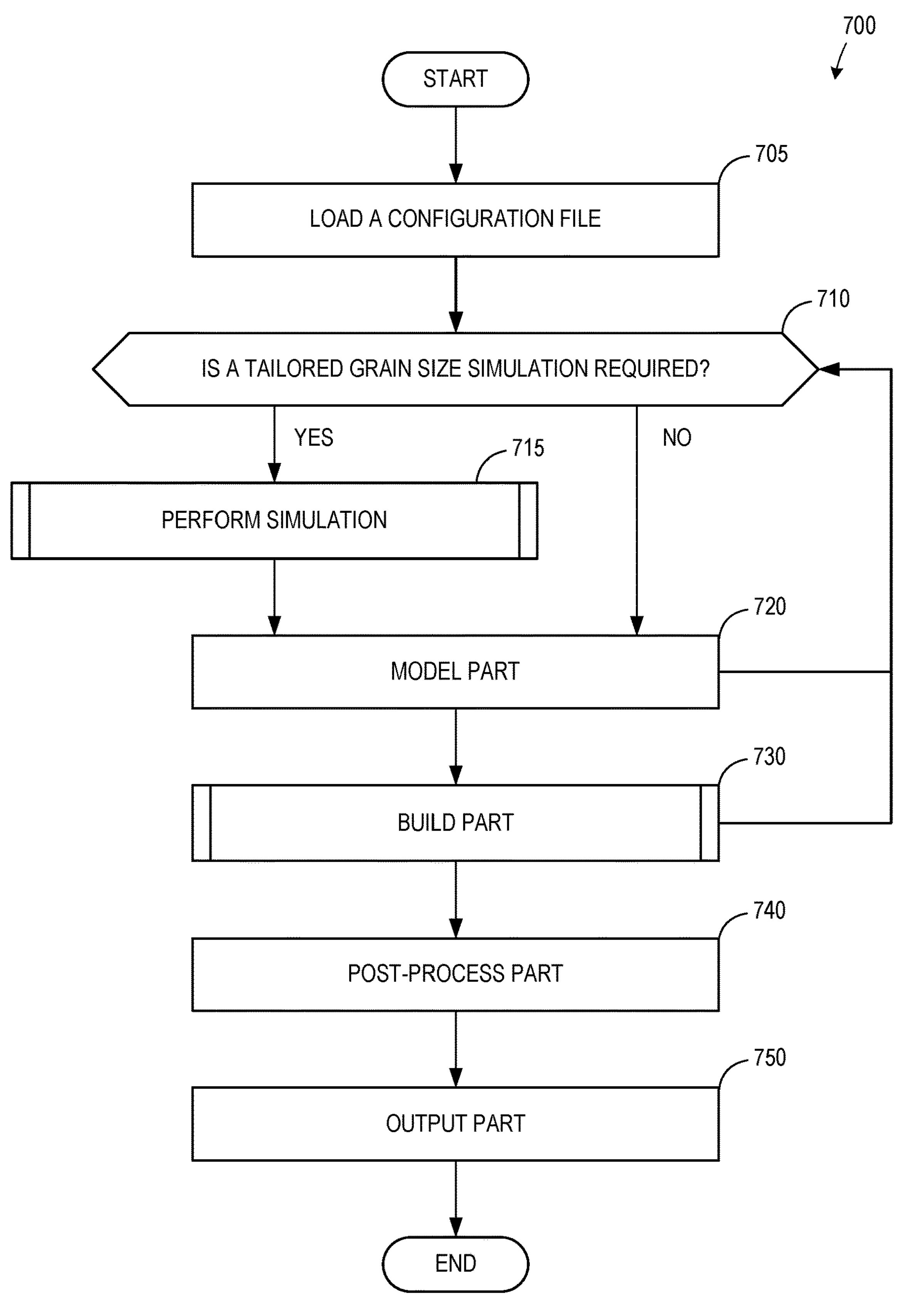
FIG. 7 is a flowchart representative of example machine readable instructions and/or example operations that can be executed and/or instantiated by example processor circuitry to implement the example controller circuitry of FIG. 1A.
Figure 8:
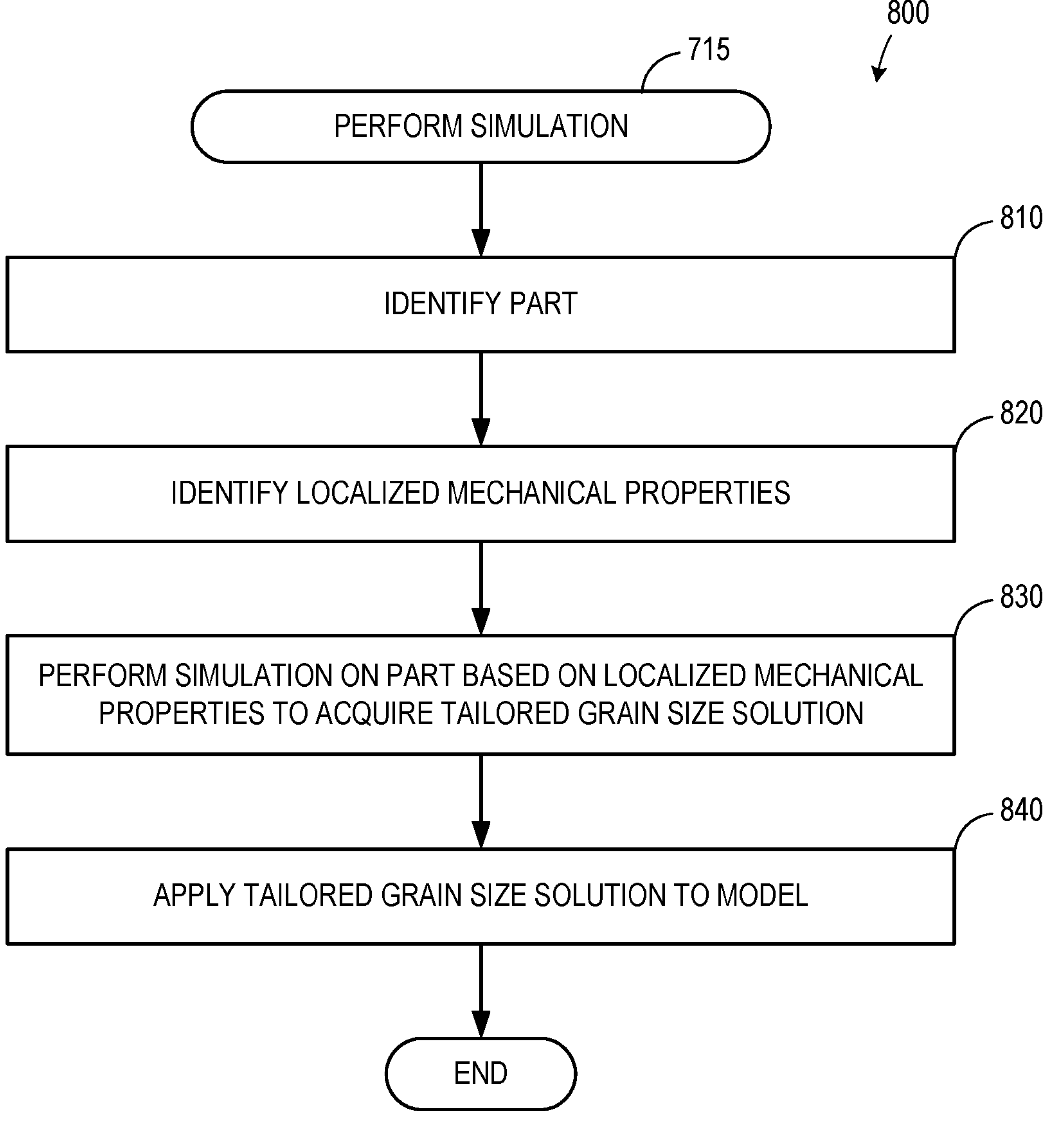
FIG. 8 is a flowchart representative of example machine readable instructions and/or example operations that can be executed and/or instantiated by example processor circuitry to implement the example simulation of mechanical properties of FIG. 7 to generate a tailored grain size solution.

While an example implementation of the example controller circuitry 120 of FIG. 1A is illustrated in FIGS. 7, 8, and/or 9, one or more of the elements, processes, and/or devices illustrated in FIGS. 7, 8, and/or 9 may be combined, divided, re-arranged, omitted, eliminated, and/or implemented in any other way. Further, the example controller circuitry 120 of FIG. 1A, may be implemented by hardware alone or by hardware in combination with software and/or firmware. Thus, for example, the example controller circuitry 120, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example controller circuitry 120 of FIG. 1A may include one or more elements, processes, and/or devices in addition to, or instead of, those illustrated in FIGS. 7, 8, and/or 9, and/or may include more than one of any or all of the illustrated elements, processes and devices.

Flowcharts representative of example machine readable instructions, which may be executed to configure processor circuitry to implement the example controller circuitry 120, is shown in FIGS. 7, 8, and/or 9. The machine readable instructions may be one or more executable programs or portion(s) of an executable program for execution by processor circuitry, such as the processor circuitry 1012 shown in the example processor platform 1000 discussed below in connection with FIG. 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 7, 8, and/or 9, many other methods of implementing the example controller circuitry 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7, 8, and/or 9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

FIG. 7 is a flowchart representative of example machine readable instructions and/or example operations that can be executed and/or instantiated by processor circuitry to implement the controller circuitry 120 of FIG. 1A. The example manufacturing process 700 of FIG. 7 begins at block 705 by loading a configuration file containing information regarding the building of the part 140. In some examples, the configuration file can include information such as material to be used for the build, orientation of the build, part size, tailored grain size solutions, the standard operating conditions for the part 140, etc.

When the controller circuitry 120 loads the configuration file, the controller circuitry 120 then determines whether a new tailored grain size simulation is to be performed on the part 140. (Block 710). In some examples, the example part 140 can be a low-pressure turbine (LPT) casing which is subject to differing temperatures radially inwards 635 towards the engine centerline axis 620. The example part 140, before printing, may need to go through a simulation to determine the localized mechanical properties and/or operating conditions to determine the appropriate tailored grain sizes for the application. Different applications call for different grain sizes in an example part 140, and thus acquiring/defining the mechanical properties and/or operating conditions may be necessary before a simulation to determine the appropriate grain size can be initiated.

When the example controller circuitry 120 determines that a simulation for a tailored grain size solution is to be performed (e.g., block 710 returns a result of YES), the example controller circuitry 120 performs a simulation for a tailored grain size solution. (Block 715). In some examples, the example instructions of block 715 are implemented by an example tailored grain size simulation process 800 of FIG. 8.

When the example controller circuitry 120 determines that no tailored grain size simulation is required (e.g., block 710 returns a result of NO), or when the example tailored grain size simulation process 800 from block 715 is completed, the example controller circuitry 120 then models the part 140 to be built by the additive manufacturing machine 110. (Block 720). In some examples, the model of the example part 140 is performed in computer-aided-design (CAD) software or other modeling process used to apply structural modifications to the instructions sent to the additive manufacturing machine 110 to print the example part 140. In some examples, the example controller circuitry 120 implements means for modelling the part 140 based on a computer model.

The example controller circuitry 120 then controls the additive manufacturing machine 110 to build the example part 140 based on the model created from block 720. (Block 730).

In some examples, the tailored grain size simulation of block 715, the modelling of the example part 140 of block 720, and/or the building of the example part 140 of block 730 can be performed in series or in parallel. In other examples, blocks 710, 715, and 720 are skipped, where the part 140 is built directly from the configuration file loaded from block 705. In some examples, each of blocks 715, 720, and/or 730 can be performed as each layer of the example part 140 is created by the additive manufacturing machine 110. In such an example, the simulation from block 715 can be run on the in-progress layer 260 to determine the appropriate grain size. The example manufacturing process 700 then models the in-progress layer 260 from block 720 to be used by the additive manufacturing machine 110. The in-progress layer 260 is then built by the additive manufacturing machine 110 at block 730 which applies the appropriate conditions to the in-progress layer 260, which can include the tailored grain size simulation from block 715 in some examples. In some examples, each of these steps can be performed in substantial real-time with each other to allow for constant adjustments to the grain size of the example part 140 during the additive process. In some examples, the example controller circuitry 120 implements means for adjusting the simulation to produce the desired grain size from block 715, the modelling of the part 140 from block 720, and/or the building of the part 140 from block 730 while the part 140 is being manufactured by the additive manufacturing machine 110.

The example controller circuitry 120 then performs a post-process procedure on the example part 140 after the build process from block 730 is complete. (Block 740). In some examples, the post-processing of block 740 can include a scan of the part for errors or printing deficiencies, a structural analysis of the final part for structural deformities, a trimming of excess printing material that is left over, etc.

Once the post-processing procedure of block 740 is complete, the example controller circuitry 120 then outputs the example part 140. (Block 750). In some examples, the outputting of the example part 140 can include instructing the additive manufacturing machine 110 to vacate the area for operator intervention, removing all heat sources from the area of build, separating the example part 140 from the build table 152, etc.

FIG. 8 is a flowchart representative of example machine readable instructions and/or example operations that may be executed and/or instantiated by processor circuitry to implement the simulation for a tailored grain size solution (block 715) of FIG. 7. The example tailored grain size simulation process 800 of FIG. 8 begins at block 810, at which the example controller circuitry 120 identifies the example part 140 requiring a tailored grain size solution. In some examples, the example part 140 may be the low-pressure turbine (LPT) casing, high-pressure turbine (HPT) casing, etc., each of which may operate under significantly differing operating conditions which require differing solutions for a tailored grain size.

Once the example controller circuitry 120 identifies the example part 140 selected to be built, the example controller circuitry 120 then identifies the localized mechanical properties of the example part 140. (Block 820). In some examples, as mentioned above, the example part 140 may be used in extreme operating conditions, such as a low-pressure turbine in an aircraft engine, and a simulated representation of those mechanical properties subject to the operating conditions is included to determine the grain sizes throughout the geometric shape of the example part 140. In some examples, the identification of the localized mechanical properties can be performed by structural analysis software, thermal analysis software, airflow analysis, etc. In some examples, the controller circuitry 120 implements means for identifying localized mechanical properties of the part based on the operating conditions the part is subject to.

The example controller circuitry 120 then performs a simulation on the example part 140 based on the localized mechanical properties acquired from block 820 to produce an optimal grain size solution. (Block 830). In some examples, the simulation can include analyzing the temperature gradients during operation along the geometric shape of the example part 140 and determining the grain size that will provide the best strength/fatigue properties for the portions of the example part 140 that are subjected to lower temperatures and the best creep performance for the portions of the example part 140 that are subjected to higher temperatures. In some examples, the controller circuitry 120 implements means for performing the simulation based on the localized mechanical properties to produce the desired grain size.

The example controller circuitry 120 then applies the result of the simulation from block 830 to the model and proceeds with the example manufacturing process 700 of FIG. 7. (Block 840). In some examples, the model of the example part 140 is performed in CAD software or any other form of modeling process used to apply structural modifications to the instructions sent to the additive manufacturing machine 110 to print the example part 140, and the outcome of the simulation is applied to the medium in which the example part 140 is being modelled. In some examples, the controller circuitry 120 implements means for applying the result of the simulation to the model of the part.

Figure 9:
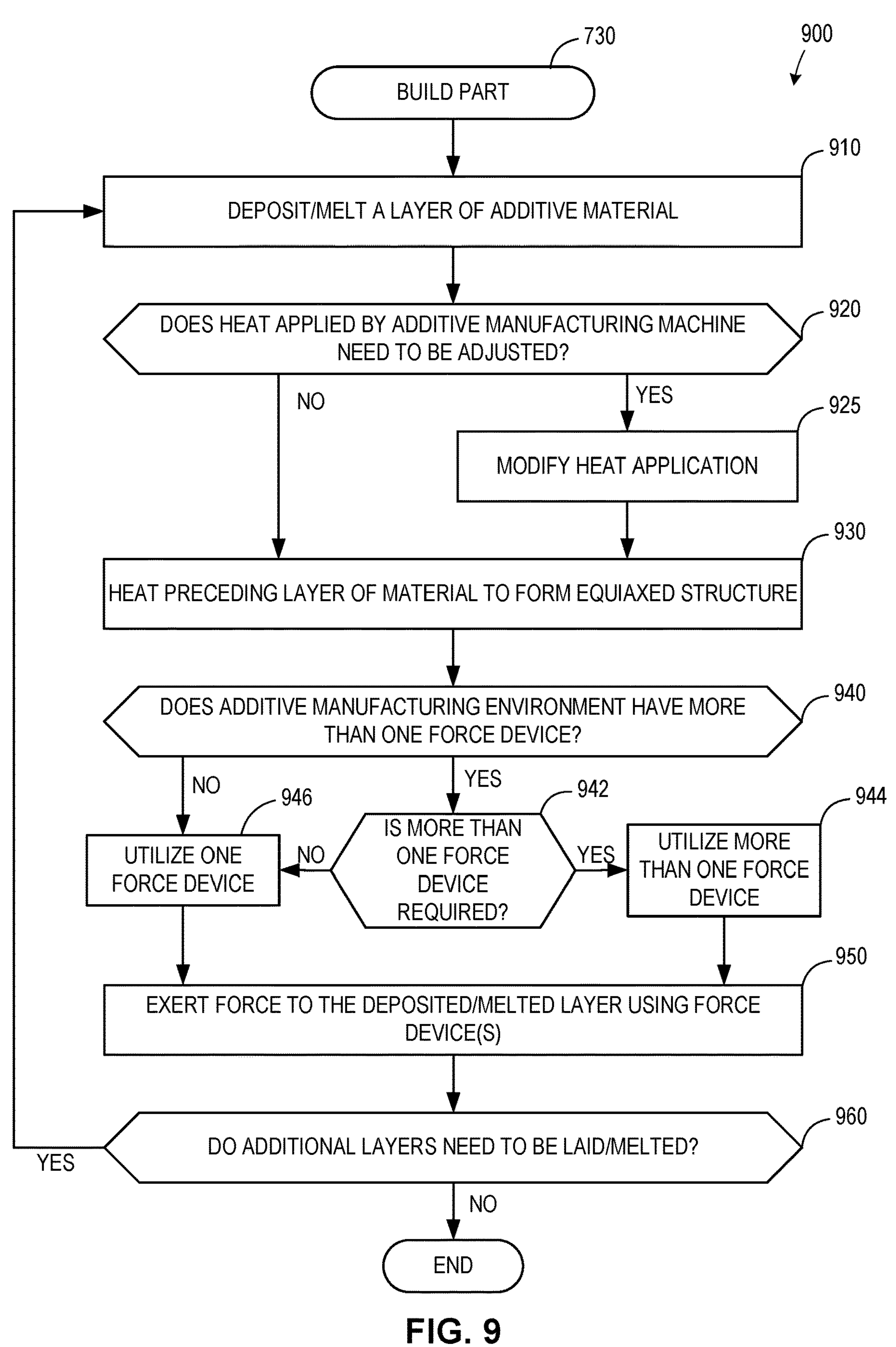
FIG. 9 is a flowchart representative of example machine readable instructions and/or example operations that can be executed and/or instantiated by example processor circuitry to implement the building of the part of FIG. 7.

FIG. 9 is a flowchart representative of example machine readable instructions and/or example operations that may be executed and/or instantiated by processor circuitry to implement the building of the part 140 (block 730) of FIG. 7. The example part building process 900 begins at block 910, at which the controller circuitry 120 instructs the additive manufacturing machine 110 to deposit/melt the in-progress layer 260. In some examples, the depositing/melting of the in-progress layer 260 can be in the form of laying a wire of material. In other examples, the depositing/melting of the in-progress layer 260 of material can include laying a bed of powdered material which is then melted via a laser (or any of the AM process described above) to form the in-progress layer 260 of material. In some examples, the controller circuitry 120 implements means for depositing the in-progress layer 260 of additive material.

Once the in-progress layer 260 of material is deposited/melted, the controller circuitry 120 determines whether the heat source applied by the additive manufacturing machine 110 needs to be adjusted (e.g., the temperature applied by the heat source needs to be changed). (Block 920). In some examples, the heat applied by the additive manufacturing machine 110 is to be adjusted to modify the equiaxed structure of the preceding layer 265 of material (e.g., the layer of material that was deposited/melted prior to the in-progress layer 260 of material). When the controller circuitry 120 determines that the heat applied by the additive manufacturing machine 110 is to be adjusted, then the controller circuitry 120 modifies the heat/temperature (e.g., modifying the heat source's magnitude) applied by the additive manufacturing machine 110. (Block 925). In some examples, the controller circuitry 120 implements means for modifying the magnitude of the heat source applied by the additive manufacturing machine 110 to the preceding layer 265 of material.

When the heat application has been modified from block 925 or when the controller circuitry 120 determines that the heat applied by the additive manufacturing machine 110 does not need to be adjusted (e.g., block 920 returns a result of NO), then the controller circuitry 120 instructs the additive manufacturing machine 110 to heat the preceding layer 265 of material to form the equiaxed structure. (Block 930). As stated above, the re-heating of the preceding layer 265 allows for the preceding layer 265 to form the equiaxed structure. In some examples, the controller circuitry 120 implements means for administering the heat source to the preceding layer 265 of additive material.

Once the preceding layer 265 of material has been heated, the controller circuitry 120 then determines whether the additive manufacturing environment 100 has more than one force application device 165 available. (Block 940). In some examples, the additive manufacturing environment 100 includes a top roller 230 which applies a vertical force to the in-progress layer 260 of material (e.g., the in-progress layer 260). In some examples, the additive manufacturing environment 100 includes a top roller 230 and additional side rollers (e.g., the internal side roller 310 and the external side roller 320) to provide one or more horizontal forces to the in-progress layer 260 of material.

When the controller circuitry 120 determines that there is more than one force application device 165 available (e.g., block 940 returns a result of YES), then the controller circuitry 120 proceeds to determine whether more than one force application device 165 is to be used. (Block 942). In some examples, the desired grain size can be created by applying differing forces across all force application devices available. This allows the additive manufacturing environment 100 to create a single layer of material with varying grain sizes throughout the single layer of material, which has been previously unattainable. In such an example, the controller circuitry 120 can determine that, to create a particular grain size, only the top roller 230 (e.g., one force application device 165) is to be used. In other examples, the controller circuitry 120 may determine that the grain size is created by applying the top roller 230 and the internal side roller 310. Additionally, or alternatively, any combination or variation of force application devices present can be used to create the desired grain size(s) within the single layer of material.

When the controller circuitry 120 determines that more than one force application device 165 is to be used to create the desired grain size (e.g., block 942 returns a result of YES), then the controller circuitry 120 engages a plurality of force application devices to apply force(s) to the in-progress layer 260 of material. (Block 944). In some examples, the controller circuitry 120 instructs the force application devices to engage based on instructions associated with the model of the part 140 and/or the simulation to generate the desired grain size. In some examples, the plurality of force application devices may engage on multiple layers of the part 140 during manufacture.

Alternatively, when the controller circuitry 120 determines that more than one force application device 165 is not to be used (e.g., block 942 returns a result of NO), or when the controller circuitry 120 determines that there is not more than one force application device 165 available (e.g., block 940 returns a result of NO), then the controller circuitry 120 engages the force application device 165 to apply the force to layer of material. (Block 946).

Once the controller circuitry 120 determines the appropriate utilization of the force application devices available (e.g., block 946 or block 944 completes), then the controller circuitry 120 commands the force application device(s) (e.g., the top roller 230, the internal side roller 310, and the external side roller 320) to exert force(s) on the deposited/melted layer of material using the force application device (s). (Block 950). Depending on the force application devices available, in some examples, the controller circuitry 120 can exert a vertical force and at least one horizontal force on the single layer of material during manufacture. In some examples, the controller circuitry 120 implements means for exerting the force on the in-progress layer 260 of material.

Once the controller circuitry 120 finishes the in-progress layer 260 of material, the controller circuitry 120 then determines whether additional layers are to be laid/melted. (Block 960). When the controller circuitry 120 determines that additional layers are to be deposited/melted (e.g., block 960 returns a result of YES), then blocks 910 through 950 are repeated until no additional layers are to be laid/melted.

Once all layers have been completed, then block 960 returns a result of NO and ends the example part building process 900.

Figure 10:
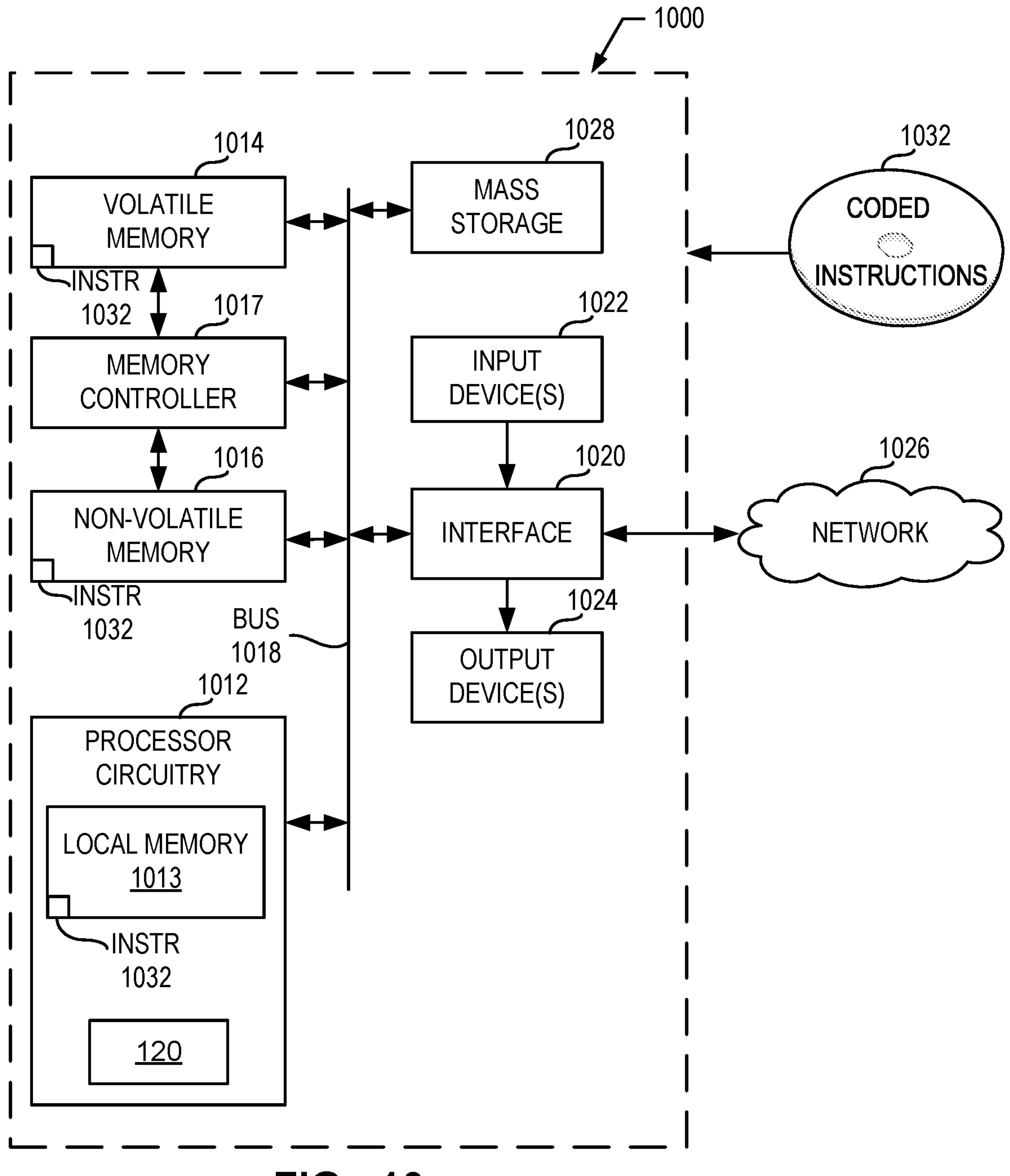
FIG. 10 is a block diagram of an example processing platform including processor circuitry structured to execute the example machine readable instructions and/or the example operations of FIGS. 7, 8, and/or 9 to implement the example controller circuitry of FIG. 1A.

FIG. 10 is a block diagram of an example processor platform 1000 structured to execute and/or instantiate the machine readable instructions and/or the operations of FIGS. 7, 8, and/or 9 to implement the example controller circuitry 120 of FIG. 1A. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example controller circuitry 120.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a camera (still or video), a keyboard, a button, a mouse, a touchscreen, a track-pad, and/or a trackball.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.) and/or a printer. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1032, which may be implemented by the machine readable instructions of FIGS. 7, 8, and/or 9, may be stored in the mass storage device 1028, in the volatile memory 1014, in the non-volatile memory 1016, and/or on a removable non-transitory computer readable storage medium such as a CD or DVD.

From the foregoing, it will be appreciated that, methods and apparatus have been disclosed that provide a tailored grain size solution for an additive manufactured product of varying sizes. Certain examples disclosed herein enable an additive manufacturing environment to create a component with differing grain sizes throughout each layer of the component, reducing weight and increasing performance across the entire component by engaging multiple force roller devices and controlling a heat source applied to each layer of the component to have greater control over the grain size. Certain examples disclosed herein also enable the additive manufacturing environment to simulate and model the component to determine the appropriate grain size throughout the component. Current systems, methods, apparatus, and articles of manufacture do not allow for this and require the component to have a single grain size throughout the component, which leads to components of higher weights and decreased performance.

Example additive manufacturing apparatus and related methods are disclosed herein. Further examples and combinations thereof include the following:

Example 1 includes an apparatus comprising controller circuitry to determine a configuration for manufacture of a part, the part having a first portion and a second portion, an additive manufacturing machine to manufacture the part according to the configuration, and a force application device to apply a force to the part during manufacture, the force specified in the configuration to produce a desired grain size, the desired grain size including a first grain size and a second grain size, wherein the first portion is formed with the first grain size and the second portion is formed with the second grain size.

Example 2 includes the apparatus of any preceding clause, further including a post-processing device to modify the part from the additive manufacturing machine.

Example 3 includes the apparatus of any preceding clause, wherein the force application device includes a top roller for applying a vertical force to the part during manufacture.

Example 4 includes the apparatus of any preceding clause, wherein the force application device further includes a side roller for applying a horizontal force to the part during manufacture.

Example 5 includes the apparatus of any preceding clause, wherein the force application device includes a first side roller to apply a first horizontal force inward towards the center of the part and a second side roller to apply a second horizontal force outward away from the center of the part.

Example 6 includes the apparatus of any preceding clause, wherein the force application device applies a variable force, the variable force capable of being different for each of the top roller, first side roller, and second side roller.

Example 7 includes the apparatus of any preceding clause, wherein the additive manufacturing machine applies a heat source to a first layer of material and a second layer of material, the first layer of material being a previous layer of material, the second layer of material being a current layer of material, the heat source having a magnitude corresponding to a temperature of the heat source.

Example 8 includes the apparatus of any preceding clause, wherein the magnitude of the heat source is variable.

Example 9 includes the apparatus of any preceding clause, wherein the desired grain size is variable within a single layer of material by modifying at least one of a heat source applied by the additive manufacturing machine or the force applied by the force application device.

Example 10 includes an additive manufacturing apparatus comprising at least one memory, machine readable instructions, and processor circuitry to at least one of instantiate or execute the machine readable instructions to build a part based on a configuration, the part having a first portion and a second portion, wherein the processor circuitry instructs an additive manufacturing machine to produce a desired grain size by modifying a force applied by a force application device to the part during manufacture, the desired grain size including a first grain size corresponding to the first portion and a second grain size corresponding to the second portion.

Example 11 includes the additive manufacturing apparatus of any preceding clause, wherein the processor circuitry further includes machine readable instructions to post-process the part after completion of the build, and output the part.

Example 12 includes the additive manufacturing apparatus of any preceding clause, wherein the processor circuitry further includes machine readable instructions to perform a simulation to produce the desired grain size.

Example 13 includes the additive manufacturing apparatus of any preceding clause, wherein the machine readable instructions to perform the simulation to produce the desired grain size further includes instructions to identify localized mechanical properties of the part based on operating conditions the part is subject to, perform the simulation on the part based on the localized mechanical properties to obtain the desired grain size, and apply a result of the simulation to a model of the part.

Example 14 includes the additive manufacturing apparatus of any preceding clause, wherein at least one of a simulation for the desired grain size, a modelling of the part to be built by the additive manufacturing machine, or the building of the part are adjustable during the additive manufacturing process.

Example 15 includes the additive manufacturing apparatus of any preceding clause, wherein the machine readable instructions to build the part further include instructions to deposit a first layer of additive material, administer a heat source to a preceding layer of additive material, and exert the force on the first layer of additive material.

Example 16 includes the additive manufacturing apparatus of any preceding clause, wherein the force exerted includes exerting a vertical force on the first layer of additive material.

Example 17 includes the additive manufacturing apparatus of any preceding clause, wherein the force exerted includes exerting a horizontal force on the first layer of additive material.

Example 18 includes the additive manufacturing apparatus of any preceding clause, wherein the heat source heating the preceding layer of additive material is variable.

Example 19 includes a method for producing a desired grain size in an additive manufacturing process comprising forming a first grain size at a first location of a part on a first layer of additive material, and forming a second grain size, different from the first grain size, at a second location of the part on the first layer of additive material, wherein the desired grain size is produced by applying a first force to the first location and a second force to the second location using a force application device during manufacture in a single build to generate the part.

Example 20 includes the method of any preceding clause, wherein building the part further includes depositing the first layer of additive material, administering a heat source to a preceding layer of additive material, and exerting a force on the first layer of additive material.

Example 21 includes the method of any preceding clause, further including modelling a part to be built, wherein a simulation for the desired grain size, the modelling of the part to be built, and the building of the part are performed in parallel and can be adjusted during manufacture.

Example 22 includes the method of any preceding clause, further including performing a simulation to produce the desired grain size which includes identifying localized mechanical properties of a part based on operating conditions the part is subject to, performing the simulation based on the localized mechanical properties to produce the desired grain size, and applying a result of the simulation to a model of the part.

Example 23 includes the method of any preceding clause, further including modifying the heat source applied to the preceding layer of additive material.

Example 24 includes the method of any preceding clause, wherein exerting the force further includes exerting a vertical force on the first layer of additive material.

Example 25 includes the method of any preceding clause, wherein exerting the force further includes exerting a horizontal force on the first layer of additive material.

Example 26 includes the method of any preceding clause, further including post-processing a part formed by the additive manufacturing process, and outputting the part for use.

Example 27 includes an apparatus comprising means for building a part, the part having a first portion and a second portion, and means for producing a desired grain size, the means for producing including means for modifying a force applied by a force roller device to the part during manufacture, the desired grain size having a first grain size corresponding to the first portion and a second grain size corresponding to the second portion.

Example 28 includes the apparatus of any preceding clause, further including means for performing a simulation to produce the desired grain size.

Example 29 includes the apparatus of any preceding clause, further including means for adjusting at least one of the means for modelling the part, a means for performing a simulation to produce the desired grain size, or the means for building the part during manufacture.

Example 30 includes the apparatus of any preceding clause, wherein the means for performing a simulation to produce the desired grain size includes means for identifying localized mechanical properties of the part based on operating conditions the part is subject to, means for performing the simulation based on the localized mechanical properties to produce the desired grain size, and means for applying a result of the simulation to a model of the part.

Example 31 includes the apparatus of any preceding clause, further including means for modelling the part.

Example 32 includes the apparatus of any preceding clause, wherein the means for building the part further includes means for depositing a first layer of additive material, means for administering a heat source to a preceding layer of additive material, the heat source having a magnitude corresponding to a temperature of the heat source, and means for exerting the force on the first layer of additive material.

Example 33 includes the apparatus of any preceding clause, further including means for modifying the magnitude of the heat source applied to the preceding layer of additive material.

Example 34 includes the apparatus of any preceding clause, further including means for post-processing the part.

Example 35 includes the apparatus of any preceding clause, wherein the means for post-processing the part further includes means for cutting the part to remove excess material.

Example 36 includes the apparatus of any preceding clause, wherein the means for post-processing the part further includes means for scanning the part for at least one of a deficiency or an error from the build.

Example 37 includes the apparatus of any preceding clause, wherein the means for post-processing the part further includes means for heating the part.

Example 38 includes the apparatus of any preceding clause, wherein the means for post-processing the part further includes means for cooling the part.

Example 39 includes the apparatus of any preceding clause, wherein the means for post-processing the part further includes means for polishing the part.

Example 40 includes an apparatus to create a component with desired grain sizes in an additive manufacturing process comprising an additive manufacturing machine to manufacture the component according to a configuration, and a force application device to apply a force to the component during manufacture, the force specified in the configuration to produce a desired grain size in at least a portion of the component, wherein the apparatus creates the component by forming a first grain size at a first location on a first layer of additive material, and forming a second grain size at a second location on the first layer of additive material, wherein the component with the desired grain sizes is produced by applying a first force to the first location and a second force to the second location using the force application device during manufacture in a single build.

Example 41 includes the apparatus of any preceding clause, wherein the apparatus further creates the component by administering a heat source to a preceding layer of additive material, the heat source having a magnitude corresponding to a temperature of the heat source.

Example 42 includes the apparatus of any preceding clause, wherein the magnitude of the heat source is variable.

Example 43 includes an engine casing including at least a first region of a first grain size and a second region of a second grain size.

Example 44 includes an additive manufactured component including at least a first region of a first grain size and a second region of a second grain size.

Example 45 includes the additive manufactured component of any preceding clause, wherein the first region and the second region are on a single layer of additive material.

Example 46 includes a non-transitory machine readable storage medium comprising instructions that, when executed, cause processor circuitry to at least form a first grain size at a first location of a part on a first layer of additive material, and form a second grain size at a second location of the part on the first layer of additive material, wherein the desired grain size is produced by applying a first force to the first location and a second force to the second location using a force application device during manufacture in a single build to generate the part.

Example 47 includes the non-transitory machine readable storage medium of any preceding clause, further including instructions that, when executed, cause the processor circuitry to deposit the first layer of additive material, administer a heat source to a preceding layer of additive material, and exert a force on the first layer of additive material.

Example 48 includes the non-transitory machine readable storage medium of any preceding clause, further including instructions that, when executed, cause the processor circuitry to modify the heat source applied to the preceding layer of additive material.

Example 49 includes the non-transitory machine readable storage medium of any preceding clause, further including instructions that, when executed, cause the processor circuitry to exert a vertical force on the first layer of additive material.

Example 50 includes the non-transitory machine readable storage medium of any preceding clause, further including instructions that, when executed, cause the processor circuitry to exert a horizontal force on the first layer of additive material.

Example 51 includes the non-transitory machine readable storage medium of any preceding clause, further including instructions that, when executed, cause the processor circuitry to model a part to be built, wherein a simulation for the desired grain size, the modelling of the part to be built, and the building of the part are performed in parallel and can be adjusted during manufacture.

Example 52 includes the non-transitory machine readable storage medium of any preceding clause, further including instructions that, when executed, cause the processor circuitry to perform a simulation to produce the desired grain size.

Example 53 includes the non-transitory machine readable storage medium of any preceding clause, further including instructions that, when executed, cause the processor circuitry to identify localized mechanical properties of a part based on operating conditions the part is subject to, perform the simulation based on the localized mechanical properties to produce the desired grain size, and apply a result of the simulation to a model of the part.

Example 54 includes the non-transitory machine readable storage medium of any preceding clause, further including instructions that, when executed, cause the processor circuitry to post-process a part formed by the additive manufacturing process, and output the part for use.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:

controller circuitry configured to:

perform a simulation based on an operating temperature and a stress performance of a first portion and a second portion of a part to determine a first grain size and a second grain size of the part, wherein the operating temperature and the stress performance vary between the first portion and the second portion of the part; and determine a configuration for manufacture of the first portion and the second portion of the part based on the simulation, the determination of the configuration to specify the first grain size for the first portion and specify the second grain size for the second portion based on the simulation, wherein the first grain size is different from the second grain size;

an additive manufacturing machine to manufacture the part according to the configuration, the controller circuitry in communication with the additive manufacturing machine to control the additive manufacturing machine to manufacture the part according to the configuration by depositing material forming the first portion and the second portion of the part; and a force application device connected to the additive manufacturing machine and in communication with the controller circuitry, the force application device to apply a first force to the first portion and a second force to the second portion, after deposition by the additive manufacturing machine during manufacture, wherein the controller circuitry instructs the force application device to apply the first force specified in the configuration according to the simulation to produce the first grain size and the second force specified in the configuration according to the simulation to produce the second grain size.

2. The apparatus of claim 1, further including a post-processing device to modify the part from the additive manufacturing machine.

3. The apparatus of claim 1, wherein the force application device includes a top roller for applying a vertical force to the part during manufacture.

4. The apparatus of claim 3, wherein the force application device further includes a side roller for applying a horizontal force to the part during manufacture.

5. The apparatus of claim 3, wherein the force application device includes a first side roller to apply a first horizontal force inward towards a center of the part and a second side roller to apply a second horizontal force outward away from the center of the part.

6. The apparatus of claim 5, wherein the force application device applies a variable force, the variable force capable of being different for each of the top roller, the first side roller, and the second side roller.

7. The apparatus of claim 1, wherein the additive manufacturing machine applies a heat source to a first layer of material and a second layer of material, the first layer of material being a previous layer of material, the second layer of material being a current layer of material, the heat source having a magnitude corresponding to a temperature of the heat source.

8. The apparatus of claim 7, wherein the magnitude of the heat source is variable.

9. The apparatus of claim 1, wherein a grain size is variable between the first grain size and the second grain size within a single layer of material by modifying at least one of a heat source applied by the additive manufacturing machine or the first force and/or the second force applied by the force application device, wherein the controller circuitry instructs at least one of the additive manufacturing machine or the force application device to modify at least one of a heat or a force applied to the single layer of material based on the configuration.

10. The apparatus of claim 1, further including a sensor communicatively coupled to the controller circuitry and configured to measure one or more operating conditions of at least one of the additive manufacturing machine, the force application device, or the part being manufactured.

11. The apparatus of claim 10, wherein the sensor is a temperature sensor, the one or more operating conditions include the operating temperature of the deposited material, and the temperature sensor measures the operating temperature of the deposited material, and wherein the controller circuitry configures, based on the measured operating temperature, a distance between a deposition head and the force application device.

12. The apparatus of claim 10, wherein the sensor is a stress sensor, the one or more operating conditions include the stress performance of the deposited material, and the stress sensor measures the stress performance of the deposited material in the first portion after the force application device has applied the first force, and wherein the controller circuitry is configured to modify at least one of the additive manufacturing machine or the force application device based on the measured stress performance surpassing a threshold.

13. The apparatus of claim 1, wherein the first force is greater than the second force, and, as a magnitude of the first force increases, an area of the first portion including the first grain size increases.

14. The apparatus of claim 13, wherein as the magnitude of the first force increases, the first grain size decreases.

* * * * *